US010450216B2

United States Patent
Saito et al.

(10) Patent No.: US 10,450,216 B2
(45) Date of Patent: Oct. 22, 2019

(54) GLASS SHEET PROCESSING METHOD AND GLASS SHEET PROCESSING APPARATUS

(71) Applicant: AGC Inc., Tokyo (JP)

(72) Inventors: Isao Saito, Tokyo (JP); Takahiro Nagata, Tokyo (JP)

(73) Assignee: AGC Inc., Tokyo (JP)

( * ) Notice: Subject to any disclaimer, the term of this patent is extended or adjusted under 35 U.S.C. 154(b) by 1036 days.

(21) Appl. No.: 14/862,525

(22) Filed: Sep. 23, 2015

(65) Prior Publication Data

US 2016/0009587 A1  Jan. 14, 2016

Related U.S. Application Data

(63) Continuation of application No. PCT/JP2014/058354, filed on Mar. 25, 2014.

(30) Foreign Application Priority Data

Mar. 26, 2013 (JP) ................................ 2013-063346

(51) Int. Cl.
  *C03B 33/09* (2006.01)
  *B23K 26/402* (2014.01)
  (Continued)

(52) U.S. Cl.
  CPC ........ *C03B 33/091* (2013.01); *B23K 26/0006* (2013.01); *B23K 26/066* (2015.10);
  (Continued)

(58) Field of Classification Search
  CPC ... C03B 33/091; C03B 33/093; B23K 26/402; B23K 26/006; B23K 26/0648
  See application file for complete search history.

(56) References Cited

U.S. PATENT DOCUMENTS 5,776,220 A  7/1998 Allaire et al.
6,420,678 B1  7/2002 Hoekstra
(Continued)

FOREIGN PATENT DOCUMENTS

CN  101821071 A  9/2010
JP  2001-212683 A  *  8/2001
(Continued)

OTHER PUBLICATIONS

Machine translation of Japan Patent document No. 2001-212,683, Aug. 2018.*

(Continued)

*Primary Examiner* — Geoffrey S Evans
(74) *Attorney, Agent, or Firm* — Oblon, McClelland, Maier & Neustadt, L.L.P.

(57) ABSTRACT

A glass sheet processing method is provided for irradiating a laser beam on a glass sheet and forming a cleavage in the glass sheet with thermal stress. If each of an irradiation area of the laser beam on the surface and an irradiation area of the laser beam on the back face of the glass sheet includes a peak position of a power density of the laser beam, each irradiation area has an asymmetrical power density distribution that is asymmetrical with respect to a reference line that passes through the peak position and is parallel to a moving direction of the peak position. If each irradiation area has no peak position, each irradiation area has an asymmetrical shape that is asymmetrical with respect to a reference line that passes through a centroid position of the irradiation area and is parallel to a moving direction of the centroid position.

20 Claims, 16 Drawing Sheets

(51) Int. Cl.

| | | |
|---|---|---|
| *B23K 26/064* | (2014.01) | |
| *B23K 26/50* | (2014.01) | |
| *B23K 26/06* | (2014.01) | |
| *B23K 26/08* | (2014.01) | |
| *B23K 26/12* | (2014.01) | |
| *B23K 26/00* | (2014.01) | |
| *B23K 26/066* | (2014.01) | |
| *B23K 26/40* | (2014.01) | |
| *B23K 26/361* | (2014.01) | |
| *B23K 103/00* | (2006.01) | |

(52) U.S. Cl.
CPC ...... *B23K 26/0648* (2013.01); *B23K 26/0853* (2013.01); *B23K 26/127* (2013.01); *B23K 26/361* (2015.10); *B23K 26/40* (2013.01); *B23K 26/402* (2013.01); *B23K 26/50* (2015.10); *C03B 33/093* (2013.01); *B23K 2103/30* (2018.08); *B23K 2103/50* (2018.08); *B23K 2103/54* (2018.08)

(56) References Cited

U.S. PATENT DOCUMENTS

| | | |
|---|---|---|
| 2006/0213883 A1 | 9/2006 | Eberhardt et al. |
| 2008/0061043 A1 | 3/2008 | Fujii |
| 2009/0126403 A1 | 5/2009 | Abramov et al. |
| 2010/0065537 A1 | 3/2010 | Watatani et al. |
| 2010/0147813 A1 | 6/2010 | Lei et al. |
| 2015/0209898 A1* | 7/2015 | Kim ................ B23K 26/08 65/112 |

FOREIGN PATENT DOCUMENTS

| | | | |
|---|---|---|---|
| JP | 2001-296586 A | * | 10/2001 |
| JP | 2005-081715 A | | 3/2005 |
| JP | 2006-263819 A | | 10/2006 |
| JP | 2008-93706 A | | 4/2008 |
| JP | 2009-066613 A | | 4/2009 |
| JP | 2011-219338 A | | 11/2011 |
| JP | 2012-126642 A | | 7/2012 |
| JP | 2014-177369 A | | 9/2014 |
| KR | 10-2004-0046421 A | | 6/2004 |
| WO | WO 2006/038565 A1 | | 4/2006 |
| WO | WO 2009/128316 A1 | | 10/2009 |

OTHER PUBLICATIONS

Machine translation of Japan Patent document No. 2001-293,586, Aug. 2018.*

International Search Report dated May 20, 2014 in PCT/JP2014/058354 filed on Mar. 25, 2014.

* cited by examiner

GLASS SHEET PROCESSING METHOD AND
GLASS SHEET PROCESSING APPARATUS

CROSS-REFERENCE TO RELATED
APPLICATION

The present application is a continuation application filed under 35 U.S.C. 111(a) claiming benefit under 35 U.S.C. 120 and 365(c) of PCT International Application No. PCT/JP2014/058354 filed on Mar. 25, 2014 and designating the U.S., which claims priority to Japanese Patent Application No. 2013-063346 filed on Mar. 26, 2013. The entire contents of the foregoing applications are incorporated herein by reference.

BACKGROUND OF THE INVENTION

1. Field of the Invention

The present invention relates to a glass sheet processing method and a glass sheet processing apparatus.

2. Description of the Related Art

Glass sheet processing methods are known that involve irradiating a laser beam on a surface of a glass sheet to heat the glass sheet, moving the laser irradiating position, and quenching a rear side of the irradiating position so that the glass sheet may be cut by thermal stress. Also, there are time when techniques need to be implemented for arranging at least a part of a cut face of the glass sheet to be diagonal with respect to the glass sheet surface. For example, such a technique may be implemented to facilitate separation of cut pieces of the glass sheet from each other. As for forming a cut face that is diagonal to the glass sheet surface, for example, a technique is disclosed that involves offsetting a quenching position with respect to the trajectory of a laser beam when quenching the rear side of the irradiating position (see e.g., Japanese Laid-Open Patent Publication No. 2011-219338).

Note that a cut face of a glass sheet may be chamfered by grinding corner portions of the cut face after cutting the glass sheet. An edge face of the glass sheet that has been chamfered may include a front side ground face that is diagonally connected to the surface of the glass sheet and a backside ground face that is diagonally connected to a back face of the glass sheet. The front side ground face and the backside ground face are arranged to be in different orientations. It has conventionally been difficult to form such a chamfered edge face profile through laser irradiation.

SUMMARY OF THE INVENTION

An aspect of the present invention is directed to providing a glass sheet processing method that is capable of forming a front side cleaved face that is diagonally connected to a surface of a glass sheet and a backside cleaved face that is diagonally connected to a back face of the glass sheet in different orientations.

According to one embodiment of the present invention, a glass sheet processing method is provided that includes the steps of irradiating a laser beam on a glass sheet such that the laser beam is transmitted through the glass sheet from a surface to a back face of the glass sheet, moving an irradiating position of the laser beam with respect to the glass sheet, and forming a cleavage in the glass sheet with thermal stress that is generated by irradiating the laser beam. The laser beam is emitted from a light source and is irradiated on the surface of the glass sheet to form an irradiation area of the laser beam on the surface, and the laser beam that has been transmitted through the surface of the glass sheet is irradiated on the back face of the glass sheet to form an irradiation area of the laser beam on the back face. In a case where each irradiation includes a peak position of the power density of the laser beam, each irradiation area is arranged to have an asymmetrical power density distribution that is asymmetrical with respect to a reference line that passes through the peak position of the irradiation area and is parallel to a moving direction of the peak position. In a case where each irradiation area does not include a peak position of the power density of the laser beam, each irradiation area is arranged to have an asymmetrical shape that is asymmetrical with respect to a reference line that passes through a centroid position of the irradiation area and is parallel to a moving direction of the centroid position.

DESCRIPTION OF THE PREFERRED EMBODIMENTS

Figure 1:
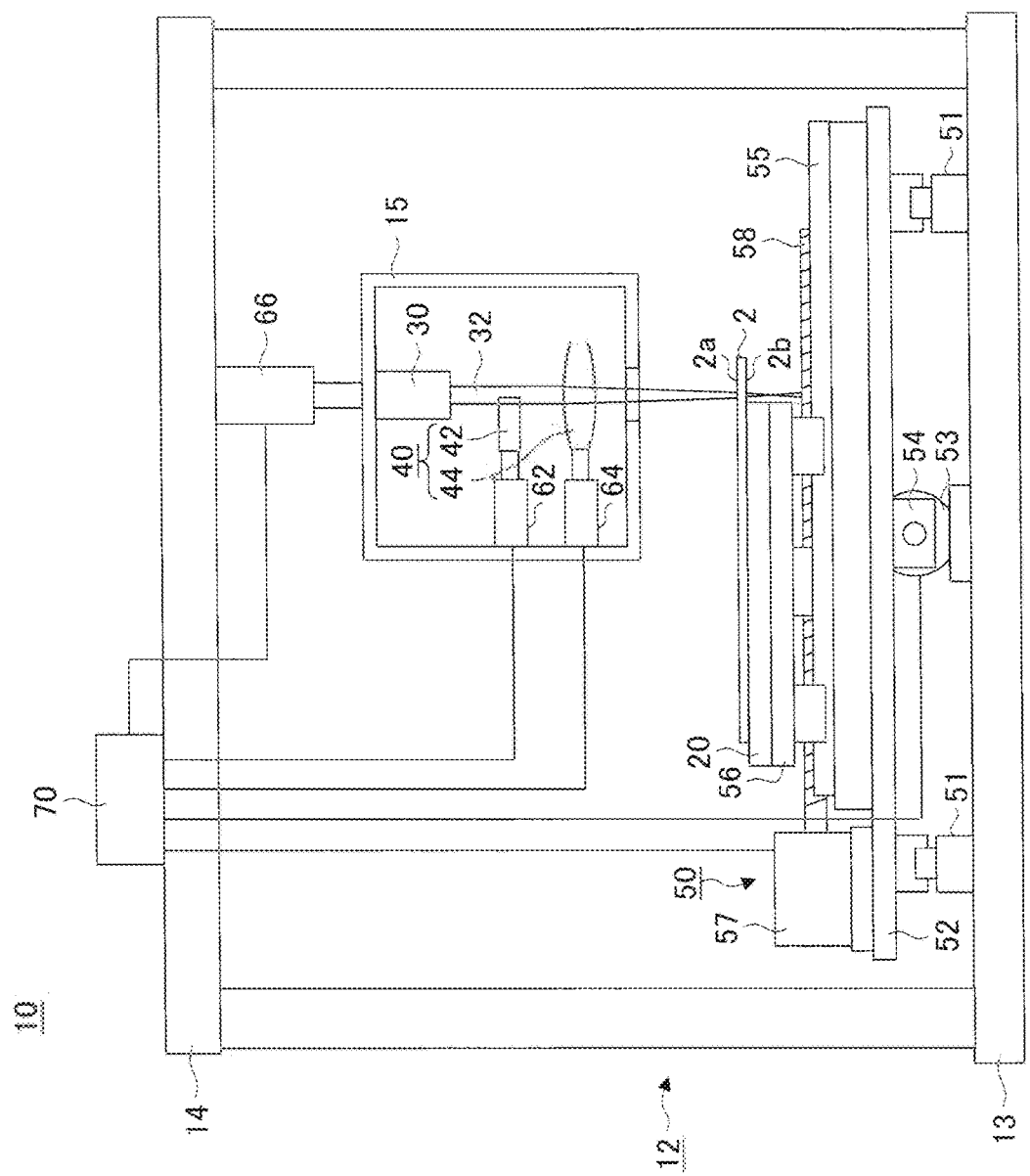
FIG. 1 is a side view of a glass sheet processing apparatus according to a first embodiment of the present invention.

In the following, embodiments of the present invention are described with reference to the accompanying drawings. Note that identical or corresponding features illustrated in the drawings are given the same or corresponding reference numbers and their descriptions may be omitted.

[First Embodiment]

Figure 2:
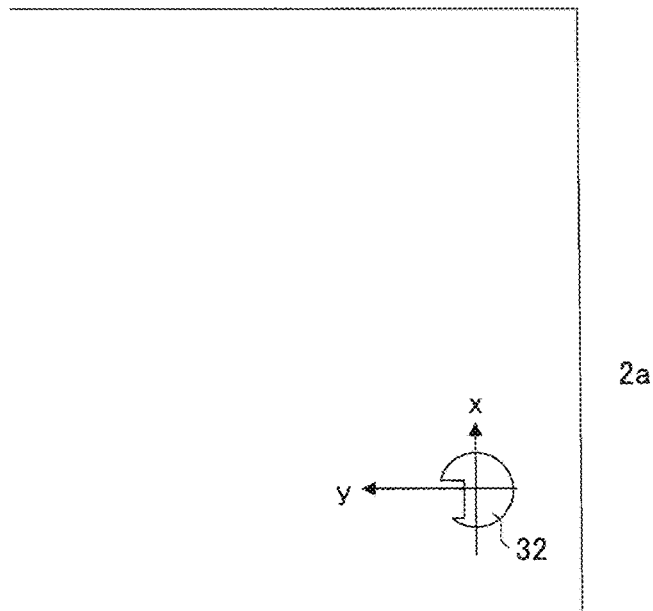
FIG. 2 is a plan view of an irradiation area of a laser beam that is formed on the surface of a glass sheet illustrated in FIG. 1.
Figure 3:
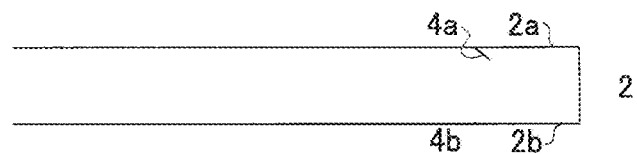
FIG. 3 illustrates a front side cleaved face and a backside cleaved face formed in the glass sheet illustrated in FIG. 1.
Figure 4:
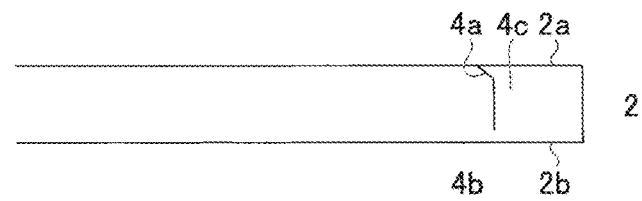
FIG. 4 illustrates an intermediate cleaved face formed in the glass sheet illustrated in FIG. 3.

FIG. 1 is a side view of a glass sheet processing apparatus 10 according to a first embodiment of the present invention. FIG. 2 is a plan view of an irradiation area a laser beam that is formed on a surface of the glass sheet illustrated in FIG. 1. FIG. 3 illustrates a front side cleaved face and a backside cleaved face formed in the glass sheet illustrated in FIG. 1. FIG. 4 illustrates an intermediate cleaved face formed in the glass sheet illustrated in FIG. 3.

In FIG. 1, the glass sheet processing apparatus 10 includes a frame 12, a support 20, a light source 30, an optical system 40, an irradiating position moving unit 50, a light shielding position adjusting unit 62, an optical axis position adjusting unit 64, a focusing position adjusting unit 66, and a control unit 70. The glass sheet processing apparatus 10 irradiates a laser beam 32 that is emitted from the light source 30 on a glass sheet 2 that is supported by the support 20. In this way, the glass sheet processing apparatus 10 forms a front side cleaved face 4a and a backside cleaved face 4b as illustrated in FIG. 3. The front side cleaved face 4a is diagonally connected to a surface 2a of the glass sheet 2, and the backside cleaved face 4b is diagonally connected to a back face 2b of the glass sheet 2. When an external force is applied to the glass sheet 2 that has the front side cleaved face 4a and the backside cleaved face 4b formed in the above manner, an intermediate cleaved face 4c interconnecting the front side cleaved face 4a and the backside cleaved face 4b may be formed as illustrated in FIG. 4. In this way, the glass sheet 2 may be cut. Note that in some cases, depending on the irradiation conditions of the laser beam 32, the intermediate cleaved face 4c may be formed by thermal stress that is generated by the irradiation of the laser beam 32 as described below.

The glass material used for the glass sheet 2 may be, for example, soda lime glass, alkali-free glass, and the like. The thickness of the glass sheet 2 may be suitably selected according to the application of the glass sheet 2. For example, the thickness of the glass sheet may be 0.005 cm to 2.5 cm.

An initial crack as a starting point for the front side cleaved face 4a or the backside cleaved face 4b may be formed in the glass sheet 2. The initial crack may be formed on the surface 2a, the back face 2b, or an edge face of the glass sheet 2, for example.

As the method of forming the initial crack, any conventional method may be used such as using a cutter, a file, or laser, for example. In a case where an edge face of the glass sheet 2 is ground by a rotating grindstone, for example, a micro-crack formed by such a grinding operation may be used as the initial crack.

In some embodiments, the glass sheet processing apparatus 10 may include an initial crack forming unit for forming an initial crack, for example. The initial crack forming unit may include a wheel cutter and a hydraulic cylinder for pressing the cutting edge of the wheel cutter into the glass sheet 2, for example.

The support 20 is a member that supports the glass sheet 2. For example, the support 20 may support the glass sheet 2 by vacuum suction. A supporting face of the support 20 for supporting the glass sheet 2 may be parallel to a floor portion 13 of the frame 12, and may be horizontally disposed, for example.

The light source 30 emits the laser beam 32 to be transmitted through the glass sheet 2 on the support 20 from the surface 2a to the back face 2b. The optical axis of the light source 30 may be perpendicular to the floor portion 13 of the frame, and may be vertically disposed, for example. The laser beam 32 emitted from the light source 30 may have a circular cross-sectional shape, for example.

The light source 30 may include a near-infrared laser which emits near-infrared light at a wavelength of 800 nm to 1100 nm (hereinafter simply referred to as "near infrared light"), for example. Specific examples of a near-infrared laser include a Yb fiber laser (wavelength: 1000 nm to 1100 nm), a Yb disk laser (wavelength: 1000 nm to 1100 nm), an Nd:YAG laser (wavelength: 1064 nm), and a high-output semiconductor laser (wavelength: 808 nm to 980 nm). These near-infrared lasers are high-output lasers that are relatively inexpensive and also enable easy adjustment of transmittance to a desired range, for example.

In the case of using a near-infrared laser, the absorption coefficient (α) of the glass sheet 2 increases as the iron (Fe) content, the cobalt (Co) content, or the copper (Cu) content of the glass sheet 2 increases. Also, in this case, as the content of a rare earth element (e.g., Yb) of the glass sheet 2 increases, the absorption coefficient (α) at around the absorption wavelength of the rare earth element increases. In view of costs and glass transparency requirements, iron is used to adjust the absorption coefficient (α) of the glass sheet 2 in the present embodiment. As such, the glass sheet 2 does not have to contain substantial amounts of cobalt, copper, or rare earth elements.

In the present embodiment, an inexpensive high-output near-infrared laser is used as the light source 30. However, other light sources that emit light at various wavelengths ranging from 250 nm to 5000 nm may be used. For example, a UV laser (wavelength: 355 nm), a green laser (wavelength: 532 nm), a Ho:YAG laser (wavelength: 2080 nm), an Er:YAG laser (2940 nm), a laser using a mid-infrared optical parametric oscillator (wavelength: 2600 nm to 3450 nm) may be used.

Provided the laser beam 32 changes its intensity from $I_0$ to I while travelling a distance D (cm) within the glass sheet 2, the intensity I of the glass sheet 2 satisfies the formula: $I=I_0 \times \exp(-\alpha \times D)$. This formula is referred to as the Beer-Lambert law. Note that α ($cm^{-1}$) represents the absorption coefficient of the glass sheet 2 with respect to the laser beam 32. The absorption coefficient α may be determined by factors such as the wavelength of the laser beam 32 and the chemical composition of the glass sheet 2. The absorption coefficient α may be measured using an ultraviolet-visible-near-infrared spectrophotometer, for example.

A product (α×M) of the absorption coefficient α ($cm^{-1}$) of the glass sheet 2 with respect to the laser beam 32 and a moving distance M (cm) of the laser beam 32 from the surface 2a to the back face 2b of the glass sheet 2 is preferably greater than 0 and less than or equal to 3.0. In this way, desirably high internal transmittance of the laser beam 32 with respect to the glass sheet 2 may be obtained, and both the surface 2a and the back face 2b of the glass sheet 2 may be adequately heated. The product α×M is more preferably less than or equal to 2.3 (internal transmittance is greater than or equal to 10%), and more preferably less than or equal to 1.6 (internal transmittance is greater than or equal to 20%). When the product α×M is too small, the internal transmittance may be too high and the absorption efficiency may be too low. Thus, the product α×M is preferably greater than or equal to 0.002 (internal transmittance is less than or equal to 99.8%), more preferably greater than or equal to 0.01 (internal transmittance is less than or equal to 99%), and more preferably greater than or equal to 0.02 (internal transmittance is less than or equal to 98%). Note that the internal transmittance refers to the transmittance when no light reflection occurs at the surface 2a of the glass sheet 2.

Note that the heating temperature of the glass sheet 2 may be set to a temperature below the annealing point of glass. When the heating temperature of the glass sheet 2 exceeds the annealing point of glass, the glass may turn into viscous fluid and thermal stress may be relaxed so that cleavage formation may become difficult.

When the laser beam 32 is incident perpendicularly with respect to the surface 2a of the glass sheet 2, the moving distance M of the laser beam 32 moving from the surface 2a to the back face 2b of the glass sheet 2 is equal to the thickness (t) of the glass sheet 2. On the other hand, when the laser beam 32 is incident on the surface 2a of the glass sheet 2 diagonally with respect to the surface 2a, the laser beam 32 is refracted according to Snell's law. Provided γ represents the refraction angle of the laser beam 32, the moving distance M of the laser beam 32 moving from the surface 2a to the back face 2b of the glass sheet 2 may be approximated based on the formula: $M=t/\cos \gamma$.

The optical system 40 irradiates the laser beam 32 emitted from the light source 30 on the glass sheet 2 that is supported by the support 20. The optical system 40 includes, for example, a light shielding portion 42 for shielding a part of the light flux of the laser beam 32 and a focus lens 44 for focusing the remainder of the light flux of the laser light 32. Note that in some embodiments, the light shielding portion 42 and the focus lens 44 may be arranged in reverse order. That is, the light shielding portion 42 may be configured to shield a part of the light flux that has passed through the focus lens 44, for example.

An irradiation area of the laser beam 32 that is formed on the surface 2a of the glass sheet 2 may be arranged into a shape of a circle with a diameter Φa missing a portion of the circle (see FIG. 8), for example. Similarly, an irradiation area of the laser beam 32 that is formed on the back face 2b of the glass sheet 2 may be arranged into a shape of a circle with a diameter Φb missing a portion of the circle (see FIG. 10).

The light shielding portion 42 may be made of a metal plate (e.g., stainless steel plate) that is disposed parallel to the floor portion 13, for example. The light shielding portion 42 shields a part of the light flux of the laser beam 32. Note that light shielding may be realized by light absorption or light reflection, for example.

The focus lens 44 may focus the remainder of the light flux of the laser beam 32 toward the glass sheet 2 that is supported by the support 20. The optical axis of the focus lens 44 (symmetry axis) may be parallel to the optical axis of the light source 30 and may be vertically disposed.

The irradiating position moving unit 50 moves an irradiating position of the laser beam 32 with respect to the glass sheet 2 that is supported by the support 20. For example, the irradiating position moving unit 50 may move the irradiating position of the laser beam 32 with respect to the glass sheet 2 by moving the support 20 along a direction parallel to the floor portion 13.

The irradiating position moving unit 50 may include, for example, a first guide rail 51, a first slider 52, a first motor 53, a first ball screw mechanism 54, a second guide rail 55, a second slider 56, a second motor 57, and a second ball screw mechanism 58.

The first guide rail 51 is laid on the floor portion 13 of the frame 12 and is configured to guide the first slider 52 in a first direction (direction perpendicular to the face of FIG. 1). The first ball screw mechanism 54 that converts a rotational motion of the first motor 53 to a linear motion of the first slider 52 is arranged between the first slider 52 and the first motor 53.

The second guide rail 55 is laid on the first slider 52 and is configured to guide the second slider 56 in a second direction (lateral direction in FIG. 1). The second ball screw mechanism 58 that converts a rotational motion of the second motor 57 into a linear motion of the second slider 56 is arranged between the second slider 56 and the second motor 57.

The support 20 is fixed to the second slider 56 and is configured to move relative to the floor portion 13 together with the second slider 56 in the first direction and the second direction. When the support 20 moves in a direction parallel to the floor portion 13, the irradiating position of the laser beam 32 with respect to the glass sheet 2 is moved. Note that although the second slider 56 is provided separately from the support 20 in the present embodiment, the second slider 56 may alternatively be provided as a part of the support 20. Also, a rotary shaft (not illustrated) may be provided between the support 20 and the second slider 56. In this way, the support 20 may be rotated by rotating the rotary shaft, and the laser beam 32 may be irradiated while rotating the glass sheet 2.

Note that although the irradiating position moving unit 50 of the present embodiment is configured to move the support 20 in a direction parallel to the floor portion 13, in some embodiments, a holder 15 that holds the light source 30 and the optical system 40 may be moved instead of the support 20, or both the support 20 and the holder 15 may be moved, for example. In this way, the irradiating position of the laser beam 32 with respect to the glass sheet 2 that is supported by the support 20 may be adjusted.

The light shielding position adjusting unit 62 adjusts the position of the light shielding portion 42 with respect to the light source 30 and adjusts the shapes of the irradiation areas of the laser beam 32 on the surface 2a and the back faces 2b of the glass sheet 2 that is supported by the support 20. For example, the light shielding position adjusting unit 62 may adjust the position of the light shielding portion 42 with respect to the light source 30 by moving the light shielding portion 42 parallel to the floor portion 13.

The light shielding position adjusting unit 62 may be an extendable cylinder having one end fixed to the holder 15 and another end fixed to the light shielding portion 42, for example. The extendable cylinder may be a fluid pressure cylinder (e.g., hydraulic cylinder) or an electric cylinder, for example. By having the extendable cylinder extend in the second direction (lateral direction in FIG. 1), the light shielding portion 42 may move parallel to the floor portion 13.

Note that although the light shielding position adjusting unit 62 of the present embodiment is configured to move the light shielding portion 42 in the second direction with respect to the floor portion 13, the light shielding portion 42 may alternatively be moved in the first direction instead of the second direction, or the light shielding portion 42 may be moved in the first direction and second direction, for example. Further, although the light shielding position adjusting unit 62 of the present embodiment is configured to move the light shielding portion 42 parallel to the floor portion 13, in other embodiments, the light source 30 may be moved instead of the light shielding portion 42, or both the light shielding portion 42 and the light source 30 may be moved, for example. In this way, the position of the light shielding portion 42 with respect to the light source 30 may be adjusted.

The optical axis position adjusting unit 64 adjusts the position of the optical axis of the focus lens 44 with respect to the optical axis of the laser beam 32 entering the focus lens 44, and adjusts the shapes of the irradiation areas of the laser beam 32 on the surface 2a and the back face 2b of the glass sheet 2 that is supported by the support 20. For example, the optical axis position adjusting unit 64 may adjust the position of the optical axis of the focus lens 44 with respect to the optical axis of the laser beam 32 entering the focus lens 44 by moving the focus lens 44 horizontally with respect to the floor portion 13.

The optical axis position adjusting unit 64 may be an extendable cylinder having one end fixed to the holder 15 and the other end fixed to a lens holder holding the focus lens 44, for example. By extending the extendable cylinder in the second direction (lateral direction in FIG. 1), the focus lens 44 may move horizontally with respect to the floor portion 13.

Note that although the optical axis position adjusting unit 64 of the present embodiment is configured to move the focus lens 44 in the second direction with respect to the floor portion 13, in other embodiments, the focus lens 44 may be moved in the first direction instead of the second direction, or the focus lens 44 may be moved in the first direction and the second direction, for example. Also, although the optical axis position adjusting unit 64 of the present embodiment is configured to move the focus lens 44 with respect to the floor portion 13, in other embodiment, the light source 30 may be moved instead of the focus lens 44, or both the focus lens 44 and the light source 30 may be moved, for example. In this way, the position of the optical axis of the focus lens 44 with respect to the optical axis of the laser beam 32 entering the focus lens 44 may be adjusted.

The focusing position adjusting unit 66 adjusts the focusing position of the laser beam 32 with respect to the glass sheet 2 that is supported by the support 20, and adjusts the shapes of the irradiation areas of the laser beam on the surface 2a and the back face 2b of the glass sheet 2. For example, the focusing position adjusting unit 66 may adjust the focusing position of the laser beam 32 with respect to the glass sheet 2 that is supported by the support 20 by moving the holder 15 in a direction perpendicular to the floor portion 13.

The focusing position adjusting unit 66 may be an extendable cylinder having one end fixed to a ceiling portion 14 of the frame 12 and another end fixed to the holder 15, for example. By expanding/contracting the extendable cylinder in the vertical direction, the holder 15 may move vertically with respect to the floor portion 13.

Note that although the focusing position adjusting unit 66 of the present embodiment is configured to move the holder 15 vertically with respect to the floor portion 13, in other embodiments, the support 20 may be moved instead of the holder 15, or both the holder 15 and the support 20 may be moved, for example. In this way, the focusing position of the laser beam 32 with respect to the glass sheet 2 may be adjusted.

The control unit 70 controls various operations of the glass sheet processing apparatus 10. The control unit 70 may be a microcomputer including a CPU and a memory, for example. The control unit 70 may have the CPU execute a program stored in the memory to control operations of the light source 30, the irradiating position moving unit 50, the light shielding position adjusting unit 62, the optical axis position adjusting unit 64, and the focusing position adjusting unit 66.

In the following, operations of the above glass sheet processing apparatus 10 (glass sheet processing method) are described with reference to FIGS. 1-3.

First, the control unit 70 controls the irradiating position moving unit 50 and the focusing position adjusting unit 66 to adjust the position of the light source 30 and the glass sheet 2 that is supported by the support 20. Also, the control unit 70 controls the light shielding position adjusting unit 62 to adjust the position of the light shielding portion 42 and the light source 30. Further, the control unit 70 controls the optical axis position adjusting unit 64 to adjust the position of the focus lens 44 and the light source 30. Note that order in which the above position adjustments are conducted is not particularly limited and may be performed simultaneously, for example.

Then, the control unit 70 activates the light source 30. The laser beam 32 emitted from the light source 30 is irradiated via the optical system 40 on the glass sheet 2 that is supported by the support 20, and the laser beam 32 is irradiated near an initial crack that has been formed in the glass sheet 2 beforehand. In this way, a cleavage may be formed in the glass sheet 2 by thermal stress that is generated by the laser irradiation.

Then, the control unit 70 activates the irradiating position moving unit 50 to move the irradiating position of the laser beam 32 with respect to the glass sheet 2. By moving the irradiating position of the laser beam 32, the cleavage formed in the glass sheet 2 may be extended, and in this way, the front side cleaved face 4a and the backside cleaved face 4b may be formed.

The front side cleaved face 4a is formed by a tensile stress that occurs in the vicinity of the surface 2a of the glass sheet 2 and is diagonally connected to the surface 2a of the glass sheet 2. Similarly, the backside cleaved face 4b is formed by a tensile stress that occurs in the vicinity of the back face 2b of the glass sheet 2 and is diagonally connected to the rear surface 2b of the glass sheet 2. The front side cleaved face 4a and backside cleaved face 4b are formed at or in the vicinity of the irradiating position of the laser beam 32. The sloping direction of the front side cleaved face 4a and the sloping direction of the backside cleaved face 4b are in opposite directions with respect to each other as illustrated in FIG. 3. For example, in FIG. 3, the front side face 4a is downward-sloping, and the backside cleaved face 4b is upward-sloping. In a case where a left side portion (larger portion) of the glass sheet 2 that is divided into the left side and right side portions by the cleavage is used as a product, connection angles between an edge face of the product and the surface 2a and the back face 2b form obtuse angles, and in this way, damage to the product at the edge face of the product can be suppressed. On the other hand, in the right side portion, the connection angles between the edge face and the surface 2a and the back face 2b form acute angles.

Figure 5:
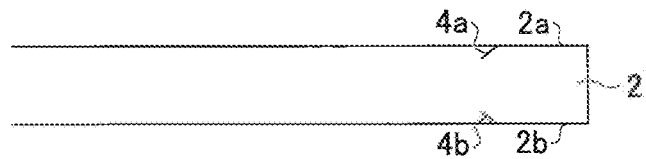
FIG. 5 illustrates a modified example of FIG. 3.

Note that the sloping directions of the front side cleaved face 4a and the backside cleaved face 4b may be reversed as illustrated in FIG. 5; that is, the front side cleaved face 4a may be upward-sloping, and the backside cleaved face 4b may be downward-sloping. In FIG. 5, when a right side portion (smaller portion) of the glass sheet 2 that is divided into the left side and right side portions of by the cleavage is used as a product, connection angles between an edge face of the product and the surface 2a and the back face 2b form obtuse angles, and in this way, damage to the product at the edge face of the product can be suppressed. On the other hand, in the left side portion, the connection angles between the edge face and the surface 2a and the back face 2b form acute angles.

As illustrated in FIGS. 3 and 5, in a portion on one side of the cutting line of the glass sheet 2, the connection angle between the surface and the front side cleaved face and the connection angle between the back face and the backside cleaved face both form obtuse angles. In contrast, in a portion on the other side of the cutting line of the glass sheet 2, the connection angle between the surface and the front side cleaved face and the connection angle between the back face and the backside cleaved face both form acute angles. As illustrated in FIG. 4, of the cut pieces obtained by cutting the glass sheet 2, a cross-section of the edge face of one of the cut pieces is convex-shaped and a cross-section of the edge face of the other cut piece is concave-shaped.

Note that whether the front side cleaved face 4a and the backside cleaved face 4b can be formed in the desired sloping directions depends mainly on the transmittance of the laser beam 32 with respect to the glass sheet 2, the power density distributions of the laser beam 32 on the surface and the back face of the glass sheet 2, and the irradiation shapes of the laser beam 32 on the surface and the back face of the glass sheet 2. The power density distributions of the laser beam 32 on the surface and the back face of the glass sheet 2 and the irradiation shapes of the laser beam 32 on the surface and the back face of the glass sheet 2 may be determined by the configuration of the optical system 40 and the like.

Figure 6:
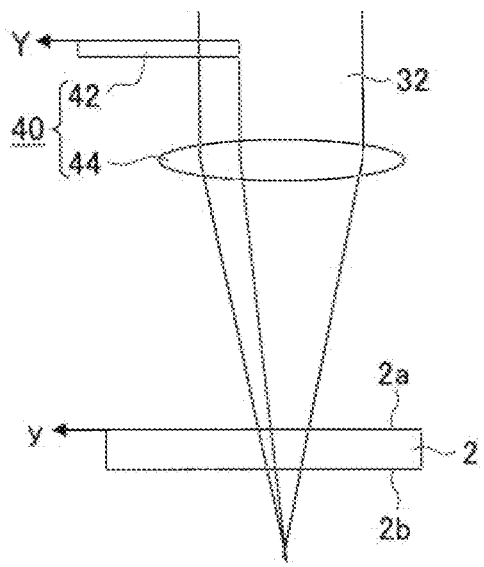
FIG. 6 is a side view of an optical system illustrated in FIG. 1.

FIG. 6 is a side view of the optical system illustrated in FIG. 1. In the following descriptions, "forward" refers to the moving direction of the irradiating position of the laser beam 32 on the surface 2a of the glass sheet 2, "rear" refers to a direction opposite the forward direction, and "left" and "right" respectively refer to directions toward the left side and the right side as viewed from a viewer standing at the irradiation position of the laser beam 32 on the surface 2a of the glass sheet 2 facing forward.

As illustrated in FIG. 6, the optical system 40 shields a part of the light flux of the laser beam 32 emitted from the light source 30 with the light shielding portion 42, focuses the remainder of the light flux of the laser beam 32 with the focus lens 44, and irradiates the laser beam 32 on the glass sheet 2 that is supported by the support 20. The focusing position of the laser beam 32 is located below the glass sheet 2 and opposite the light source 30 with respect to the glass sheet 2. The light source 30 and the focus lens 44 are coaxially disposed.

Figure 7:
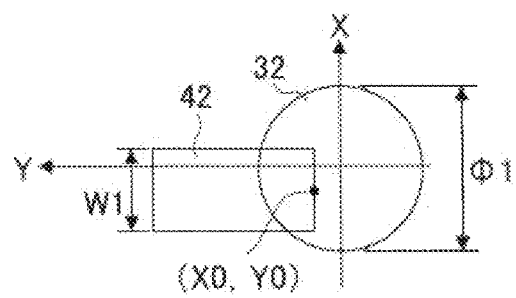
FIG. 7 is a plan view of a position of the laser beam on a plane that is coplanar with an upper face of a light shielding portion illustrated in FIG. 6.

FIG. 7 is a plan view of the position of the laser beam on a plane that is coplanar with the upper face of the light shielding portion of FIG. 6. In FIG. 7, an X-axis and a Y-axis are defined on the plane that is coplanar with the upper face of the light shielding portion 42, and the intersection point of the X-axis and the Y-axis (i.e., origin) is arranged at a peak position of the power density of the laser beam 32 on this plane. The X-axis of FIG. 7 is parallel to the x-axis of FIG. 8 (described below), and the Y-axis of FIG. 7 is parallel to the y-axis of FIG. 8.

As illustrated in FIG. 7, the light shielding portion 42 may have a rectangular shape in plan view with long sides parallel to the Y-axis direction. The width W1 of the light shielding portion 42 is smaller than the diameter Φ1 of the circular laser beam 32 on the upper face of the light shielding portion 42. The light shielding portion 42 is inserted into the optical path of the laser beam 32 from the left side. A position at the right edge center of the light shielding portion 42 (black dot in FIG. 7) is represented by orthogonal coordinates (X0, Y0).

Figure 8:
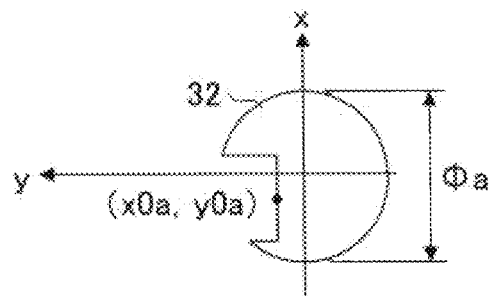
FIG. 8 is a plan view of an irradiation area of the laser beam that is formed on the surface of the glass sheet illustrated in FIG. 6.

FIG. 8 is a plan view of an irradiation area of the laser beam on the surface of the glass sheet illustrated in FIG. 6. In FIG. 8, an x-axis and a y-axis are defined on the surface 2a of the glass sheet 2, and the intersection point of the x-axis and the y-axis (i.e., origin) is arranged at a peak position of the power density of the laser beam 32 on the surface 2a. The x-axis is arranged to be parallel to the moving direction of the peak position of the power density of the laser beam 32 on the surface 2a of the glass sheet 2, and the y-axis is arranged to be perpendicular to the x-axis.

A light shielding area where the laser beam 32 is shielded by the light shielding portion 42 is formed on the surface 2a of the glass sheet 2 as illustrated in FIG. 8. A position at the center of the right side edge of the light shielding area of the laser beam 32 on the surface 2a of the glass sheet 2 (black dot in FIG. 8) is represented by orthogonal coordinates (x0a, y0a).

Figure 9:
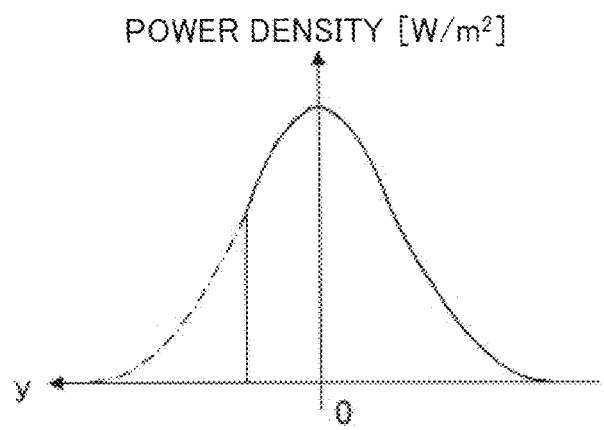
FIG. 9 is a graph showing a power density distribution on the y-axis (x=0) of FIG. 8.

FIG. 9 is a graph representing a power density distribution on the y-axis (x=0) of FIG. 8. In FIG. 9, the dot-dashed line represents the power density distribution (Gaussian distribution) on the y-axis when the light shielding portion 42 is not shielding a part of the light flux of the laser beam 32.

By having the light shielding portion 42 shield a part of the light flux of the laser beam 32, the power density distribution of the laser beam 32 on the y-axis may be arranged to be asymmetrical with respect to the x-axis (y=0) as indicated by the solid line in FIG. 9. In this way, a thermal stress distribution that is asymmetrical with respect to the x-axis (y=0) may be formed on the y-axis.

Thus, the irradiation area of the laser beam 32 on the surface 2a of the glass sheet 2 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the front side cleaved face 4a that is diagonally connected to the surface 2a of the glass sheet 2 may be formed.

Note that the formation of a desired thermal stress field on the surface 2a of the glass sheet 2 refers to a state where tensile stress generated in the irradiation area of the laser beam 32 on the surface 2a of the glass sheet 2 is deviated either toward the left side or the right side (unbalanced) with respect to the reference line (x-axis) at the rear side of the origin. The sloping direction of the front side cleaved face 4a is determined by such a deviation. When the tensile stress is deviated either toward the left side or the right side with respect to the reference line at the rear side of the origin, this means that the integral values of the tensile stress on the left side and the right side of the reference line are different at the rear side of the origin. That is, at the rear side of the origin, either the integral value of the tensile stress on the left side of the reference line is greater than that on the right side, or the integral value of the tensile stress on the right side of the reference line is greater than that on the left side. Note that because the origin moves with respect to the glass sheet 2, the tensile stress distribution at the rear side of the origin includes influences of tensile stress generated at the forward side (moving direction side) of the origin.

In the present descriptions, "power density distribution" refers to the power density distribution on a line perpendicular to the reference line (x-axis). The irradiation area of the laser beam 32 on the surface 2a of the glass sheet 2 may spread in the x-axis direction, and as such, the power density distribution may vary for each x-coordinate value. Note that if at least one of a plurality of power density distributions corresponds to a "power density distribution that is asymmetrical with respect to the x-axis", this means that the irradiation area of the laser beam 32 on the surface 2a of the glass sheet 2 includes a "power density distribution that is asymmetrical with respect to the x-axis".

Figure 10:
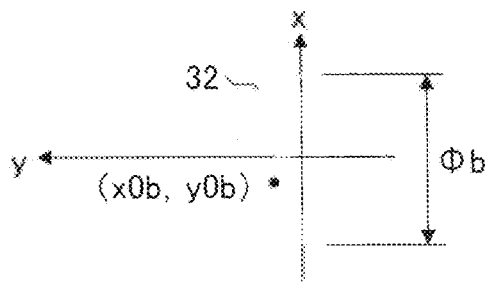
FIG. 10 is a plan view of an irradiation area of the laser beam that is formed on the back face of the glass sheet illustrated in FIG. 6.

FIG. 10 is a plan view of an irradiation area of the laser beam on the back face of the glass sheet illustrated in FIG. 6. In FIG. 10, an x-axis and a y-axis are defined on the back face 2b of the glass sheet in a manner similar to the x-axis and the y-axis illustrated in FIG. 8.

A light shielding area of the laser beam 32 where the laser beam 32 is shielded by the light shielding portion 42 is formed on the back face 2b of the glass sheet 2 as illustrated in FIG. 10. A position at the center of the right side edge of the light shielding area of the laser beam 32 on the back face 2b of the glass sheet 2 (black dot in FIG. 10) is represented by orthogonal coordinates (x0b, y0b).

The power density distribution on the y-axis (x=0) of FIG. 10 may be similar to that illustrated in FIG. 9. That is, the irradiation area of the laser beam 32 on the back face 2b of the glass sheet 2 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the backside cleaved face 4b that is diagonally connected to the back face 2b of the glass sheet 2 may be formed.

The formation of a desired thermal stress field on the back face 2b of the glass sheet 2 refers to a state where tensile stress generated in the irradiation area of the laser beam 32 on the back face 2b of the glass sheet 2 is deviated toward the left side or the right side (unbalanced) with respect to the reference line (x-axis) at the rear side of the origin. The sloping direction of the backside cleaved face 4b is determined by such a deviation. When the tensile stress is deviated toward the left side or the right side with respect to the reference line at the rear side of the origin, this means that the integral values of the tensile stress at the left side and the right side of the reference line are different at the rear side of the origin. That is, at the rear side of the origin, either the integral value of tensile stress on the left side of the reference line is greater than that of the right side, or the integral value of tensile stress on the right side of the reference line is greater than that on the left side. Note that because the origin moves with respect to the glass sheet 2, the tensile stress distribution at the rear side of the origin includes influences of tensile stress generated at the forward side (moving direction side) of the origin.

Also, the tensile stress generated in the irradiation area of the laser beam on the surface of the glass sheet and the tensile stress generated in the irradiation area of the laser beam on the back face of the glass sheet deviate in the same direction (left side or right side) with respect to the reference line (x-axis) at the rear side of the origin. In this way, the front side cleaved face that is diagonally connected to the surface of the glass sheet and the backside cleaved face that is diagonally connected to the back face of the glass sheet may be formed in different directions.

Also, the irradiation area of the laser beam 32 is only required to have an asymmetrical power density distribution that is asymmetrical with respect to the reference line at the start of cleavage formation. In other words, at the start of cleavage formation, the front side cleaved face that is diagonally connected to the surface of the glass sheet and the backside cleaved face that is diagonally connected to the back face of the glass sheet need to be formed. Even if the power distribution of the laser beam becomes symmetrical with respect to the reference line thereafter, the slope of the front side cleaved face 4a and the slope of the backside cleaved face 4b formed at the start of cleavage formation may be maintained. Also, note that the slope of the front side cleaved face 4a and the slope of the backside cleaved face 4b do not necessarily have to be formed throughout the cutting line of the glass sheet 2 and may only be formed at portions of the cutting line, for example. That is, at least a cut piece of the glass sheet 2 that is to become a product preferably includes portions having the slopes of the front side cleaved face 4a and the backside cleaved face 4b.

Figure 11:
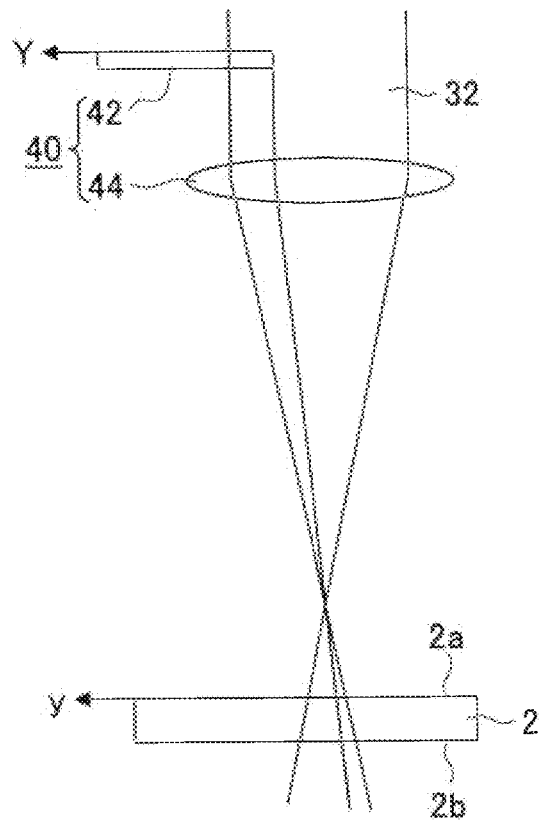
FIG. 11 is a side view of a case where a focusing position of the laser beam illustrated in FIG. 6 is moved to the opposite side of the glass sheet.

FIG. 11 is a side view of a case where the focusing position of the laser beam illustrated in FIG. 6 is moved to the opposite side of the glass sheet. Note that a plan view of the focusing position of the laser beam on a plane that is coplanar with the upper face of the light shielding portion in the case of FIG. 11 is omitted because such a plan view may be substantially identical to the plan view of FIG. 7.

As illustrated in FIG. 11, the optical system 40 shields a part of the light flux of the laser light 32 emitted from the light source 30 with the light shielding portion 42, focuses the remainder of the light flux of the laser beam 32 with the focus lens 44, and irradiates the focuses laser beam 32 on the glass sheet 2 that is supported by the support 20. The focusing position of the laser beam 32 is located above the glass sheet 2 toward the light source 30 with respect to the glass sheet 2. The light source 30 and the focus lens 44 are coaxially disposed.

Figure 12:
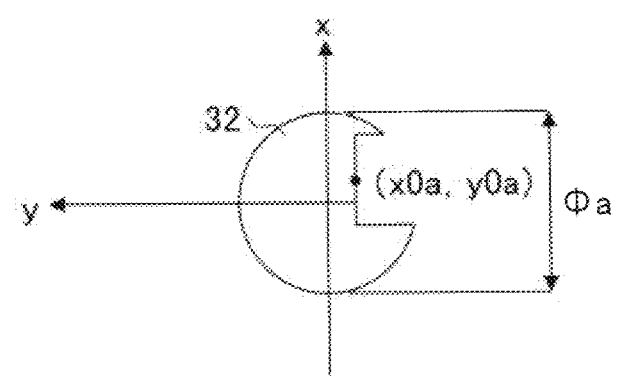
FIG. 12 is a plan view of an irradiation area of the laser beam that is formed on the surface of the glass sheet illustrated in FIG. 11.

FIG. 12 is a plan view of a laser beam irradiation area on the surface of the glass sheet illustrated in FIG. 11. In FIG. 12, an x-axis and a y-axis are defined on the surface 2a of the glass sheet 2, and the intersection point of the x-axis and the y-axis (i.e., origin) represents a peak position of the power density of the laser beam 32 on the surface 2a. On the surface 2a of the glass sheet 2, the x-axis is arranged to be parallel to the moving direction of the peak position of the laser beam 32, and the y-axis is arranged to be perpendicular to the x-axis.

When the focusing position of the laser beam 32 is moved to the opposite side of the glass sheet 2 (see FIGS. 6 and 11), a light shielding area of the laser beam 32 on the surface 2a of the glass sheet 2 is turned 180 degrees around the origin in the x-y coordinate system (see FIGS. 8 and 12). In this way, the power density distribution of the laser beam 32 may be adjusted.

Note that although the width W1 of the light shielding portion 42 of the present embodiment as illustrated in FIG. 7 is smaller than the diameter $\Phi 1$ of the laser beam 32 on the upper face of the light shielding portion 42, the width W1 may alternatively be larger than the diameter $\Phi 1$.

Figure 13:
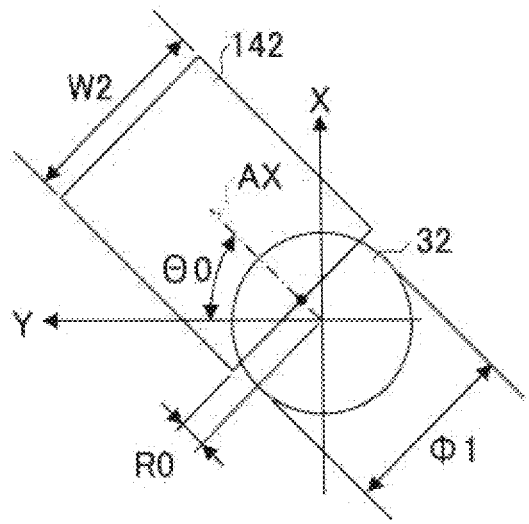
FIG. 13 is a plan view of a position of the laser beam on a plane that is coplanar with an upper face of a light shielding portion according to a first modification of the first embodiment.

FIG. 13 is a plan view of the position of the laser beam on a plane that is coplanar with an upper face of a light shielding portion according to a first modification of the first embodiment. In FIG. 13, an X-axis and a Y-axis are defined on a plane that is coplanar with an upper face of a light shielding portion 142, and an intersection point of the X-axis and the Y-axis (i.e., origin of the X-Y coordinate system) represents a peak position of the power density of the laser beam 32 on this plane. The X-axis of FIG. 13 is parallel to the x-axis of FIG. 14 (described below), and the Y-axis of FIG. 13 is parallel to the y-axis of FIG. 14.

As illustrated in FIG. 13, the light shielding portion 142 may have a rectangular shape in plan view. The width W2 of the light shielding portion 142 is greater than the diameter $\Phi 1$ of the circular laser beam 32 on the upper face of the light shielding portion 142. The light shielding portion 142 is inserted into the optical path of the laser beam 32, and a line passing through a front edge center of the light shielding portion 142 (black dot in FIG. 13) and the origin is arranged to be parallel to the longitudinal direction of the light shielding portion 142. The light shielding portion 142 is arranged to be rotatable around the origin. A position at the front edge center of the light shielding portion 142 is represented by polar coordinates (R0, Θ0). R0 represents the distance from the origin to the front edge center of the light shielding portion 142. Θ0 represents the angle between the Y-axis and a straight line AX that passes through the front edge center of the light shielding portion 142 and the origin.

Figure 14:
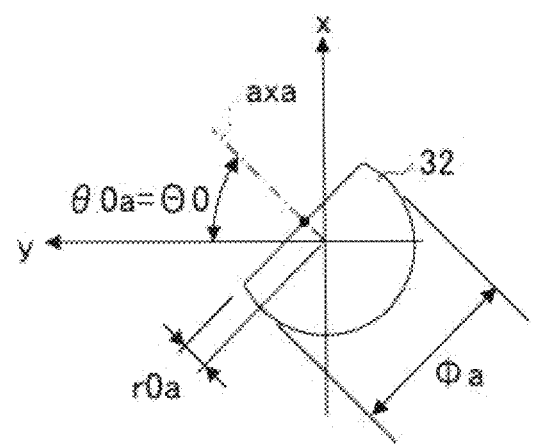
FIG. 14 is a plan view of an irradiation area of the laser beam that is formed on the surface of the glass sheet according to the first modification of the first embodiment.

FIG. 14 is a plan view of an irradiation area of the laser beam on the surface of the glass sheet according to the first modification of the first embodiment. In FIG. 14, an x-axis and a y-axis are defined on the surface 2a of the glass sheet 2, and the intersection point of the x-axis and the y-axis (i.e., origin in the x-y coordinate system) represents a peak position of the power density of the laser beam 32 on the surface 2a. On the surface 2a of the glass sheet 2, the x-axis is arranged to be parallel to the moving direction of the peak position, and the y-axis is arranged to be perpendicular to the x-axis.

A light shielding area of the laser beam 32 where light is shielded by the light shielding portion 142 is formed on the surface 2a of the glass sheet 2 as illustrated in FIG. 14. A position at a front edge center of the light shielding area of the laser beam 32 on the surface 2a of the glass sheet 2 (black dot in FIG. 14) is represented by polar coordinates (r0a, θ0a). Note that r0a represents the distance from the origin to the front edge center of the light shielding area of the laser beam 32. θ0a represents the angle between the y-axis and a straight line axa that passes through the origin and the front edge center of the light shielding area of the laser beam 32.

Figure 15:
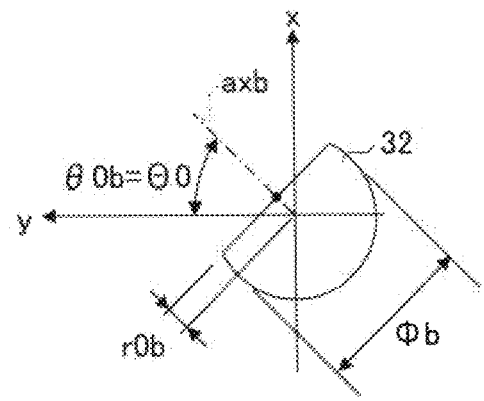
FIG. 15 is a plan view of an irradiation area of the laser beam that is formed on the back face of the glass sheet according to the first modification of the first embodiment.

FIG. 15 is a plan view of an irradiation area of the laser beam on the back face of the glass sheet according to the first modification of the first embodiment. In FIG. 15, an x-axis and a y-axis are defined on the back face 2b in a manner similar to the x-axis and the y-axis illustrated in FIG. 14.

A light shielding area of the laser beam 32 where light is shielded by the light shielding portion 142 is formed on the rear surface 2b of the glass sheet 2 as illustrated in FIG. 15. A position at a front edge center of the light shielding area of the laser light 32 on the back face 2b of the glass sheet 2 (black dot in FIG. 15) is represented by polar coordinates (r0b, θ0b). Note that r0b represents the distance from the origin to the front edge center of the light shielding area of the laser beam 32. θ0b represents the angle between the y-axis and a straight line axb that passes through the origin and the front edge center of the light shielding area of the laser beam 32.

Figure 16:
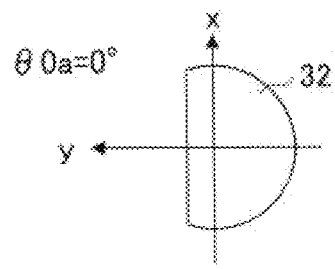
FIG. 16 is a plan view of an irradiation area of the laser beam when the angle θ0a illustrated in FIG. 14 is 0°.
Figure 17:
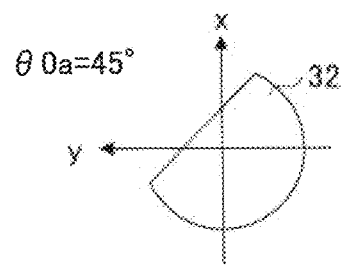
FIG. 17 is a plan view of an irradiation area of the laser beam when the angle θ0a illustrated in FIG. 14 is 45°.
Figure 18:
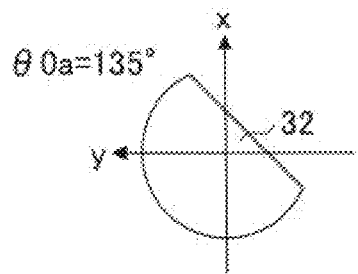
FIG. 18 is a plan view of an irradiation area of the laser beam when the angle θ0a illustrated in FIG. 14 is 135°.
Figure 19:
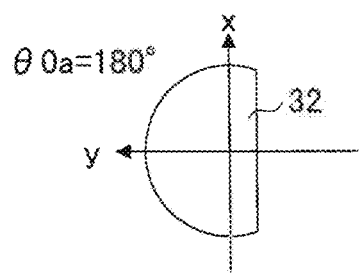
FIG. 19 is a plan view of an irradiation area of the laser beam when the angle θ0a illustrated in FIG. 14 is 180°.
Figure 20:
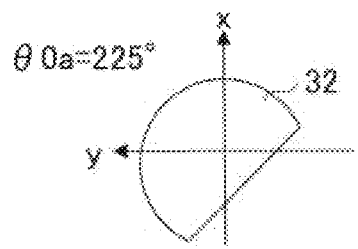
FIG. 20 is a plan view of an irradiation area of the laser beam when the angle θ0a illustrated in FIG. 14 is 225°.
Figure 21:
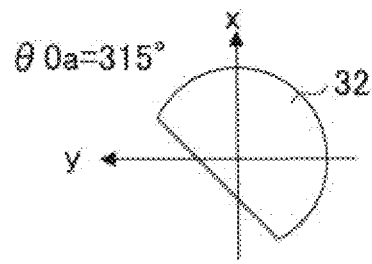
FIG. 21 is a plan view of an irradiation area of the laser beam when the angle θ0a illustrated in FIG. 14 is 315°.

FIG. 16 is a plan view of the laser beam irradiation area when the angle θ0a illustrated in FIG. 14 is 0°. FIG. 17 is a plan view of the irradiation area of the laser beam when the angle θ0a illustrated in FIG. 14 is 45°. FIG. 18 is a plan view of the irradiation area of the laser beam when the angle θ0a illustrated in FIG. 14 is 135°. FIG. 19 is a plan view of the irradiation area of the laser beam when the angle θ0a illustrated in FIG. 14 is 180°. FIG. 20 is a plan view of the irradiation area of the laser beam when the angle θ0a illustrated in FIG. 14 is 225°. FIG. 21 is a plan view of the irradiation area of the laser beam when the angle θ0a illustrated in FIG. 14 is 315°.

As illustrated in FIGS. 16 to 21, when the light shielding portion 142 is rotated, the angle θ0a changes while the distance r0a remains constant. In this way, the irradiation shape of the laser beam 32 on the surface 2a of the glass sheet 2 may be adjusted.

Also, by changing the thermal stress generated in the glass sheet by adjusting the irradiation conditions of the laser beam 32, an intermediate cleaved face 4c as illustrated in FIG. 4 may be formed in addition to the front side cleaved face 4a and the backside cleaved face 4b as illustrated in FIGS. 3 and 5.

At the irradiating position of the laser beam 32, tensile stress is generated near the surface of the glass sheet and near the back face of the glass sheet, and compressive stress is generated in the interior of the glass sheet. In contrast, at the rear side of the irradiating position of the laser beam 32, tensile stress is generated throughout the entire thickness of the glass sheet. The tensile stress is generated as a reaction force to compressive stress generated by heat that occurs at the irradiation position of the laser beam 32. The intermediate cleaved face 4c may be formed when a large tensile stress is generated at the rear side of the irradiating position of the laser beam 32 which prompts further cleavage development of the front side cleaved face 4a and the backside cleaved face 4b in the thickness direction toward the interior of the glass sheet. Note that the profile of the intermediate cleaved face 4c may be determined by the thermal stress field and the difference in stiffness between the left side and the right side of the reference line at the time the intermediate cleaved face 4c is formed.

Whether the intermediate cleaved face 4c may be formed by thermal stress generated by the irradiation of the laser beam 32 mainly depends on factors such as the transmittance of the laser beam 32 with respect to the glass sheet 2 and the output of the light source 30, for example. The intermediate cleaved face 4c may be formed when the light source 30 has a sufficiently high output such that a large tensile stress is generated at the rear side of the irradiating position of the laser beam 32. When the output of the light source 30 is low, a heating light beam emitted from a heating light source separate from the light source 30 may be irradiated on the glass sheet 2 in order to form the intermediate cleaved face 4c in the glass sheet 2, for example.

Figure 22:
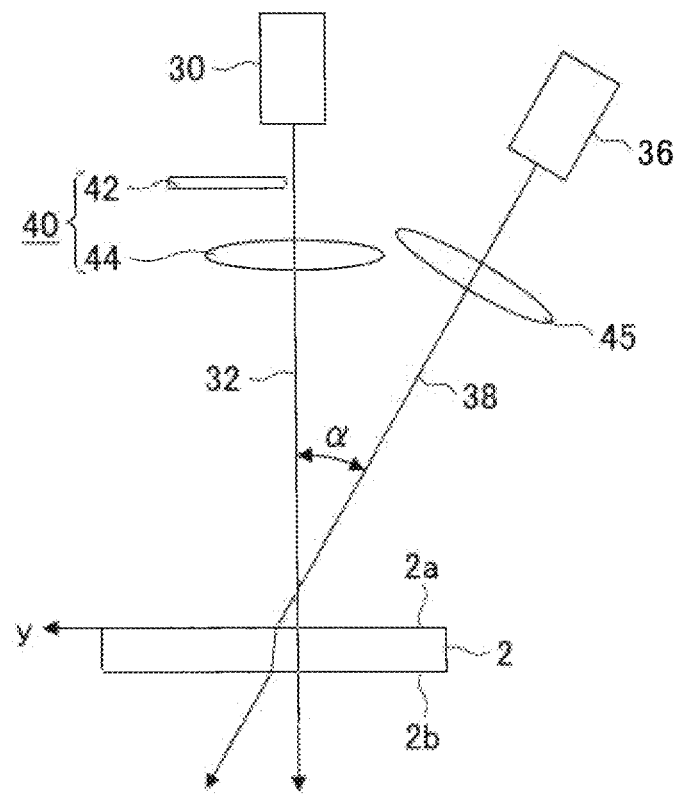
FIG. 22 is a side view of an optical system according to a second modification of the first embodiment.

FIG. 22 is a plan view of a main portion of a glass sheet processing apparatus according to a second modification of the first embodiment. In FIG. 22, a representative ray of the laser beam 32 and a representative ray of a heating light beam 38 are represented by two different arrows.

As illustrated in FIG. 22, the glass processing apparatus of the present example includes a heating light source 36 in addition to the light source 30. The heating light source 36 emits the heating light beam 38 for heating the glass sheet 2 that is supported by the support 20. The heating light beam 38 may be any light beam that is capable of heating the glass sheet 2 including light that is absorbed near the surface 2a of the glass sheet 2 as well as light that is not transmitted through the glass sheet 2. That is, the heating light source 36 does not have to be a near-infrared laser and may be a $CO_2$ laser (wavelength of 10600 nm), for example. The heating light beam 38 emitted from the heating light source 36 may be focused by a focus lens 45 and irradiated onto the surface 2a of the glass sheet 2, for example.

Figure 23:
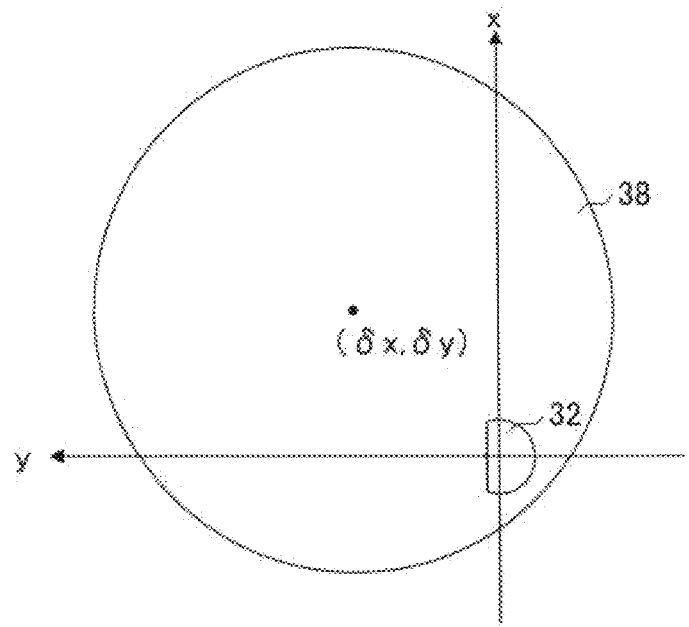
FIG. 23 is a plan view of an irradiation area of the laser beam and an irradiation area of a heating light beam on the surface of the glass sheet illustrated in FIG. 22.

FIG. 23 illustrates an irradiation area of the laser beam and an irradiation area of the heating light beam on the surface of the glass sheet illustrated in FIG. 22. In FIG. 23, an x-axis and a y-axis are defined on the surface 2a in a manner similar to the x-axis and the y-axis illustrated in FIG. 16, for example.

On the surface 2a of the glass sheet 2, the irradiation area of the heating light beam 38 may be larger than the irradiation area of the laser beam 32, and the irradiation area of the laser beam 32 may be included within the irradiation area of the heating light beam 38. A peak position of the power density of the heating light 38 is represented by orthogonal coordinates ($\delta x, \delta y$). The peak position of the power density of the heating light beam 38 may be shifted from the peak position of the power density of the laser beam 32. Also, a centroid position of the irradiation area of the heating light beam 38 may be shifted from the centroid position of the irradiation area of the laser beam 32.

The irradiating position moving unit 50 illustrated in FIG. 1 may be configured to move the irradiating position of the heating light beam 38 with respect to the glass sheet 2 along with the irradiation position of the laser beam 32 with respect to the glass sheet 2.

Also, the irradiation area of the laser beam on at least one of the surface and the back face of the glass sheet may be cooled at the same time the irradiation of the laser beam is carried out. In this way, tensile stress may be more easily generated in the irradiation area of the laser beam. That is, cleavage formation may be facilitated and stable processing may be enabled. The area of the glass sheet to be cooled may be larger than the irradiation area of the laser beam 32, for example. Note that the above arrangement may be particularly advantageous in a case where the glass sheet is a thin glass sheet that is prone to heat radiation, for example. Also, preferably, the irradiation areas of the laser beam on both the surface and the back face of the glass sheet are cooled in the above manner.

A cooling nozzle for ejecting a coolant (e.g., air) toward the glass sheet may be arranged to be coaxial with the optical axis of the laser beam. For example, at the surface side of the glass sheet, the cooling nozzle may be arranged such that the laser beam passes the opening of the cooling nozzle. By arranging the cooling nozzle to be coaxial with the optical axis of the laser beam, the irradiation area of the laser beam may be reliably cooled. Note that the cooling nozzle may similarly be arranged to be coaxial with the optical axis of the laser beam at the back face side of the glass sheet.

[Second Embodiment]

In the first embodiment, a part of the light flux of the laser beam 32 is shielded by the light shielding portion 42 such that the irradiation areas formed on the surface 2a and the back face 2b of the glass sheet 2 have shapes of a circle with a portion of the circle missing.

In contrast, in the present embodiment, a light shielding unit (more specifically, a light shielding film) includes an aperture (opening), and irradiation areas of the laser that are formed on the surface 2a and the back face 2b of the glass sheet 2 are circular in a shape. The following descriptions mainly relate to features of the present embodiment that differ from the first embodiment.

Figure 24:
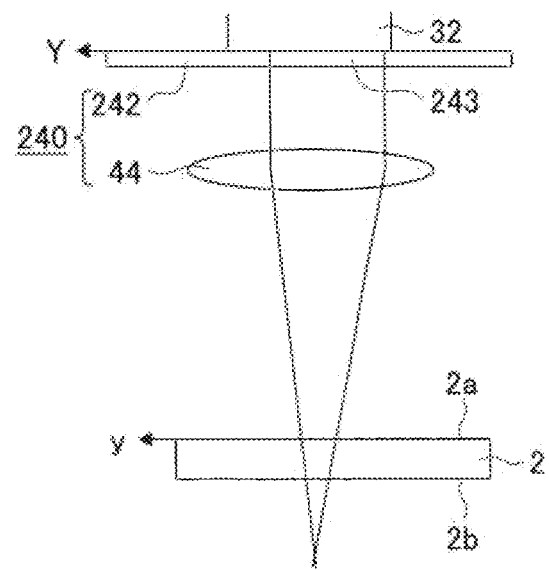
FIG. 24 is a side view of an optical system of a glass sheet processing apparatus according to a second embodiment of the present invention.

FIG. 24 is a side view of an optical system of a glass sheet processing apparatus according to a second embodiment of the present invention. As illustrated in FIG. 24, the optical system 240 includes a light shielding portion 242 that shields a part of the light flux of the laser beam 32 and a focus lens 44 that focuses the remainder of the light flux of the laser beam 32. The optical system 240 shields a part of the light flux of the laser beam 32 emitted from the light source 30 with the light shielding portion 242, focuses the remainder of the light flux of the laser beam 32 with the focus lens 44, and irradiates the focused laser beam 32 on the glass sheet 2 that is supported by the support 20. The focusing position of the laser beam 32 may be located opposite the light source 30 with respect to the glass sheet 2. The light source 30 and the focus lens 44 may be coaxially disposed.

Figure 25:
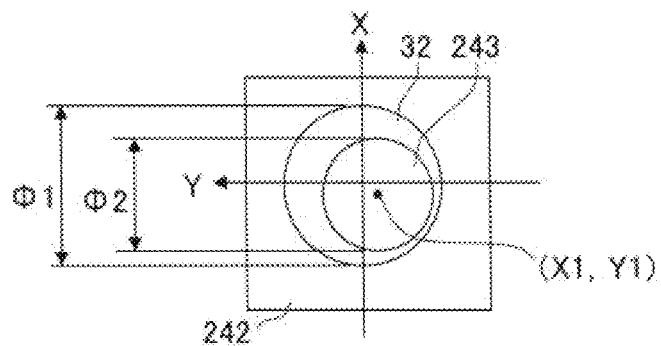
FIG. 25 is a plan view of a position of the laser beam on a plane that is coplanar with an upper face of a light shielding portion illustrated in FIG. 24.

FIG. 25 is a plan view of the position of the laser beam on a plane that is coplanar with the upper surface of the light shielding portion illustrated in FIG. 24. In FIG. 25, an X-axis and a Y-axis are defined on the plane that is coplanar with the upper surface of the light shielding portion 242, and the intersection point of the X-axis and the Y-axis (i.e., origin) represents a peak position of the power density of the laser beam 32 on this plane. Note that the X-axis of FIG. 25 is parallel to the x-axis of FIG. 26 (described below), and the Y-axis of FIG. 25 is parallel to the y-axis of FIG. 26.

The light shielding portion 242 includes a transparent plate and a light shielding film that is formed on the transparent plate. The light shielding film includes an aperture 243 for passing a part of the light flux of the laser beam 32. As illustrated in FIG. 25, the aperture 243 may have a circular shape in plan view, and may be disposed within the light flux of the laser beam 32 in a plan view. The diameter Φ2 of the aperture 243 is smaller than the diameter Φ1 of the circular laser beam 32 on the plane that is coplanar with the upper surface of the light shielding portion 242. A center position (centroid) of the aperture 243 is represented by orthogonal coordinates (X1, Y1). A center line of the aperture and the optical axis of the laser beam 32 entering the aperture 243 are shifted from each other in parallel.

Figure 26:
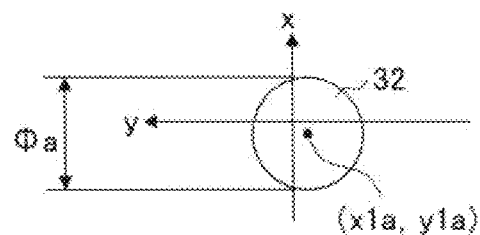
FIG. 26 is a plan view of an irradiation area of the laser beam on the surface of the glass sheet illustrated in FIG. 24.

FIG. 26 is a plan view of an irradiation area of the laser beam on the surface of the glass sheet illustrated in FIG. 24. In FIG. 26, an x-axis and a y-axis are defined on the surface 2a of the glass sheet 2, and the intersection point of the x-axis and the y-axis (i.e., origin) represents a peak position of the power density of the laser beam 32 on the surface 2a. On the surface 2a of the glass sheet 2, the x-axis is arranged to be parallel to the moving direction of the peak position of the power density of the laser beam 32, and the y-axis is arranged to be perpendicular to the x-axis.

As illustrated in FIG. 26, an irradiation area of the laser beam 32 that has passed through the aperture 243 is formed on the surface 2a of the glass sheet 2 in a circular shape. A center position (centroid position) of the circle is represented by orthogonal coordinates (x1a, y1a). The center position (centroid position) of the irradiation area of the laser beam 32 is shifted from the origin of the x-y coordinate system (i.e., the peak position of the power density of the laser beam 32).

Figure 27:
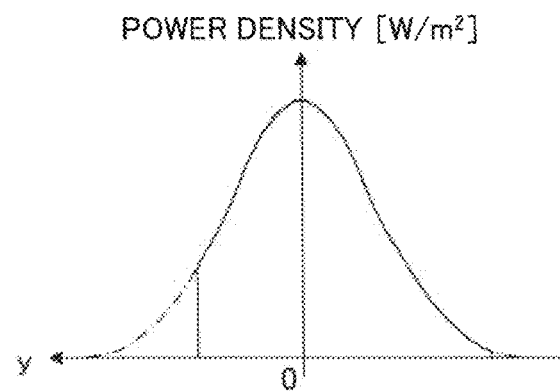
FIG. 27 is graph showing a power density distribution on the y-axis (x=0) of FIG. 26.

FIG. 27 is a graph representing a power density distribution on the y-axis (x=0) of FIG. 26. In FIG. 27 the power density distribution (Gaussian distribution) on the y-axis when the light shielding portion 242 does not shield a part of the light flux of the laser beam 32 is represented by a dot-dashed line.

By having the light shielding portion 242 shield a part of the light flux of the laser beam 32, the power density distribution of the laser beam 32 on the y-axis becomes asymmetrical with respect to the x-axis (y=0) as illustrated by the solid line in FIG. 27. In this way, a thermal stress distribution that is asymmetrical with the x-axis (y=0) is formed on the y-axis.

As can be appreciated from the above, the irradiation area of the laser beam 32 on the surface 2a of the glass sheet 2 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the front side cleaved surface 4a that is diagonally connected to the surface 2a of the glass sheet 2 may be formed.

Figure 28:
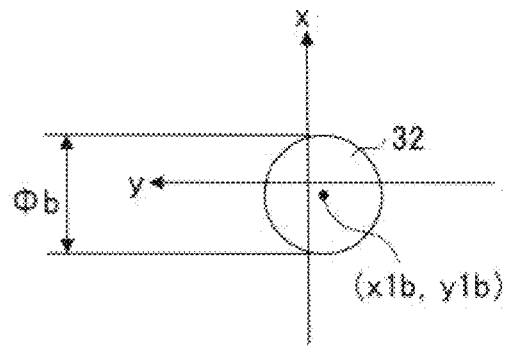
FIG. 28 is a plan view of an irradiation area of the laser beam on the back face of the glass sheet illustrated in FIG. 24.

FIG. 28 is a plan view of an irradiation area of the laser beam on the back face of the glass sheet illustrated in FIG. 24. In FIG. 28, an x-axis and a y-axis are defined on the back face 2b of the glass sheet 2 in a manner similar to the x-axis and the y-axis illustrated in FIG. 26.

As illustrated in FIG. 28, an irradiation area of the laser beam 32 that has passed through the aperture 243 is formed on the back face 2b of the glass sheet 2 in a circular shape. A center position (centroid position) of the circle is represented by orthogonal coordinates (x1b, y1b).

On the back face 2b of the glass sheet 2, the center position (centroid position) of the irradiation area of the laser beam 32 is shifted from the origin of the x-y coordinate system (i.e., the peak position of the power density of the laser beam 32).

Note that the power density distribution on the y-axis (x=0) of FIG. 28 may be substantially similar to that illustrated in FIG. 27. That is, on the back face 2b of the glass sheet 2, the irradiation area of the laser beam 32 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the backside cleaved face 4b that is diagonally connected to the back face 2b of the glass sheet 2 may be formed.

According to the present embodiment, the front side cleaved face 4a and the backside cleaved face 4b as illustrated in FIGS. 3 and 5 may be formed by the thermal stress that is generated by the irradiation of the laser beam 32. When the output of the light source 30 is sufficiently high, the intermediate cleaved face 4c as illustrated in FIG. 4 may be formed. When the output of the light source 30 is low, a heating light beam emitted from a heating light source that is separate from the light source 30 may be irradiated on the glass sheet 2 in order to form the intermediate cleaved face 4c. In this way, thermal stress generated in the glass sheet 2 may be increased and the intermediate cleaved face 4c as illustrated in FIG. 4 may be formed.

[Third Embodiment]

In the first embodiment, a part of the light flux of the laser beam 32 is shielded by the light shielding portion 42, and the focus lens 44 that focuses the remainder of the light flux of the laser beam 32 and the light source 30 are coaxially disposed.

In contrast, in the present embodiment, a light shielding portion is not provided, and the optical axis (symmetry axis) of a focus lens and the optical axis of the laser beam entering the focus lens are shifted from each other in parallel. The following descriptions mainly relate to features of the present embodiment that differ from the first embodiment.

Figure 29:
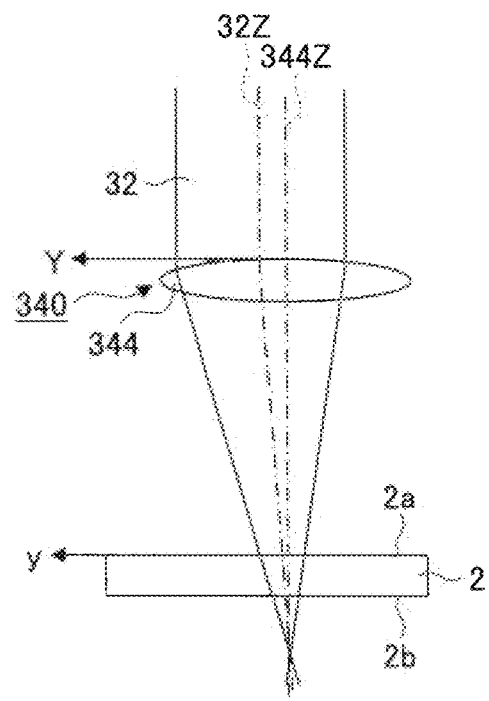
FIG. 29 is a side view of an optical system of a glass sheet processing apparatus according to a third embodiment of the present invention.

FIG. 29 is a side view of an optical system of a glass sheet processing apparatus according to a third embodiment of the present invention. As illustrated in FIG. 29, the optical system 340 includes a focus lens 344 for focusing the light flux of the laser beam 32 and is configured to irradiate the laser beam 32 on the glass sheet 2 that is supported by the support 20. The focusing position of the laser beam 32 may be located opposite the light source 30 with respect to the glass sheet 2. An optical axis 32Z of the laser beam 32 entering the focus lens 44 and an optical axis 344Z of the focus lens 344 are shifted from each other in parallel.

Figure 30:
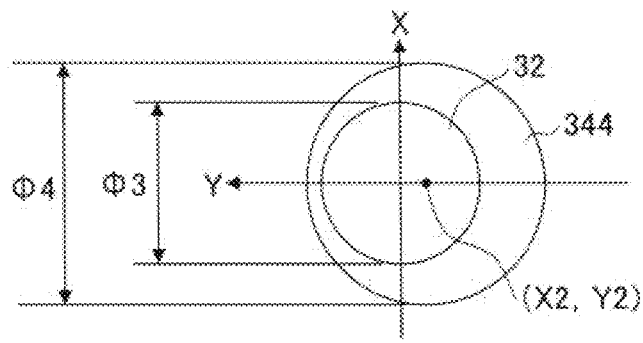
FIG. 30 is a plan view of a position of the laser beam on a plane that is coplanar with an upper end of a focus lens illustrated in FIG. 29.

FIG. 30 is a plan view of the position of the laser beam on a plane that is coplanar with an upper end of the focus lens illustrated in FIG. 29. In FIG. 30, an X-axis and a Y-axis are defined on the plane that is coplanar with the upper end of the focus lens 344, and the intersection point of the X-axis and the Y-axis (i.e., origin) represents a peak position of the power density of the laser beam 32 on this plane. The X-axis of FIG. 30 is parallel to the x-axis of FIG. 31 (described below), and the Y-axis of FIG. 30 is parallel to the y-axis of FIG. 31.

As illustrated in FIG. 30, the diameter Φ4 of the focus lens 344 is larger than the diameter Φ3 of the laser beam 32 on the plane that is coplanar with the upper end of the focus lens 344. The position of the optical axis 344Z of the focus lens 344 (block dot in FIG. 30) is represented by orthogonal coordinates (X2, Y2).

Figure 31:
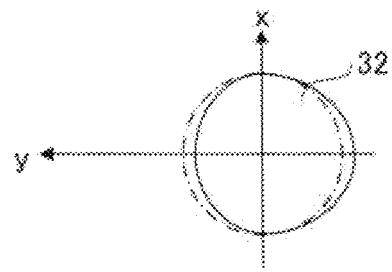
FIG. 31 is a plan view of an irradiation area of the laser beam on the surface of the glass sheet illustrated in FIG. 29.

FIG. 31 is a plan view of an irradiation area of the laser beam on the surface of the glass sheet illustrated in FIG. 29. In FIG. 31, an x-axis and a y-axis are defined on the surface 2a of the glass sheet 2, and the intersection point of the x-axis and the y-axis (i.e., origin) represents a peak position of the power density of the laser beam 32 on the surface 2a. On the surface 2a of the glass sheet 2, the x-axis is arranged to be parallel to the moving direction of the peak position of the power density of the laser beam 32, and the y-axis is arranged to be perpendicular to the x-axis. Note that in FIG. 31, an irradiation area of the laser beam when the focus lens and the light source are coaxially arranged is represented by a dot-dashed line.

The irradiation area of the laser beam 32 that has passed through the focus lens 344 is formed on the surface 2a of the glass sheet 2 as illustrated by the solid line in FIG. 31. The irradiation area of the laser beam 32 on the surface 2a of the glass sheet 2 has a distorted circular shape. Note that an irradiation area of the laser beam 32 on the back face 2b of the glass sheet 2 may have a shape that is substantially identical to that illustrated in FIG. 31, and as such, an illustration thereof is omitted.

Figure 32:
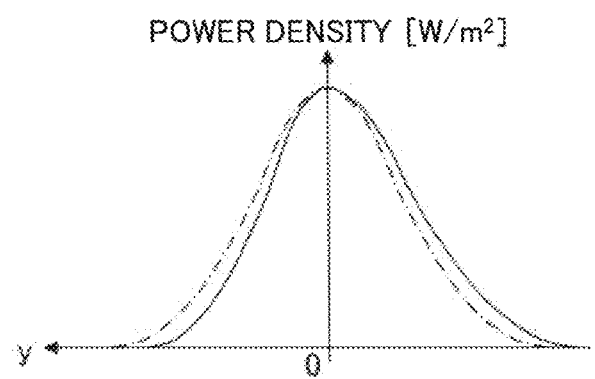
FIG. 32 is a graph showing a power density distribution on the y-axis (x=0) of FIG. 31.

FIG. 32 is a graph representing a power density distribution on the y-axis (x=0) of FIG. 31. Note that in FIG. 32, a power density distribution (Gaussian distribution) on the y-axis when the focus lens 344 and the light source 30 are coaxially disposed is represented by a dot-dashed line. Note, also, that the power density distribution on the y-axis (x=0) on the back face 2b of the glass sheet 2 may be substantially identical to the power density distribution illustrated in FIG. 32, and as such, an illustration thereof is omitted.

By having the optical axis (symmetry axis) 344Z of the focus lens 344 and the optical axis 32Z of the laser beam 32 entering the focus lens 344 shifted from each other in parallel, the power density distribution of the laser beam 32 on the y-axis becomes asymmetrical with respect to the x-axis (y=0) as indicated by the solid line in FIG. 32. In this way, a thermal stress field that is asymmetrical with respect to the x-axis (y=0) may be formed on the y-axis.

As can be appreciated from the above, on the surface 2a of the glass sheet 2, the irradiation area of the laser beam 32 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the front side cleaved face 4a that is diagonally connected to the surface 2a of the glass sheet 2 may be formed.

Similarly, on the back face 2b of the glass sheet 2, the irradiation area of the laser beam 32 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the backside cleaved face 4b that is diagonally connected to the back face 2b of the glass sheet 2 may be formed.

According to the present embodiment, the front side cleaved face 4a and the backside cleaved face 4b as illustrated in FIGS. 3 and 5 may be formed by the thermal stress that is generated by the irradiation of the laser beam 32. When the output of the light source 30 is sufficiently high, an intermediate cleaved face 4c as illustrated in FIG. 4 may be formed. When the output of the light source 30 is low, a heating light beam emitted from a heating light source that is separate from the light source 30 may be irradiated onto the glass sheet 2 in order to form the intermediate cleaved face 4c. In this way, the thermal stress generated in the glass sheet 2 may be increased, and the intermediate cleaved face 4c as illustrated in FIG. 4 may be formed.

[Fourth Embodiment]

As described above, the optical system of the first embodiment includes a focus lens. In contrast, an optical system of the present embodiment includes a cylindrical lens. The following descriptions mainly relate to features of the present embodiment that differ from the first embodiment.

Figure 33:
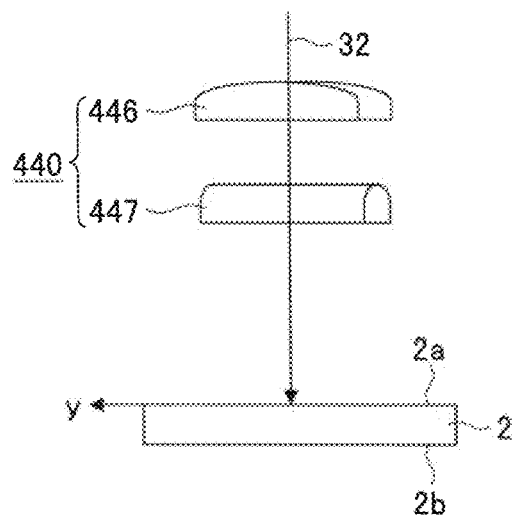
FIG. 33 is a side view of an optical system of a glass sheet processing apparatus according to a fourth embodiment of the present invention.

FIG. 33 is a side view of an optical system of the glass sheet processing apparatus according to a fourth embodiment of the present invention. In FIG. 33, a representative ray of the laser beam 32 is indicated by an arrow.

As illustrated in FIG. 33, the optical system 440 includes a first cylindrical lens 446 and a second cylindrical lens 447 that are configured to focus the light flux of the laser beam 32 in different directions. The optical system 440 irradiates the laser beam 32 that has passed through the first cylindrical lens 446 and the second cylindrical lens 447 on the glass sheet 2 that is supported by the support 20.

Figure 34:
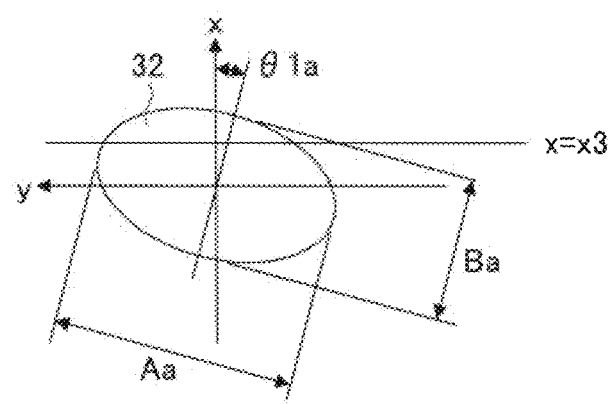
FIG. 34 is a plan view of an irradiation area of the laser beam on the surface of the glass sheet illustrated in FIG. 33.

FIG. 34 is a plan view of an irradiation area of the laser beam on the surface of the glass sheet illustrated in FIG. 33. In FIG. 34, an x-axis and a y-axis are defined on the surface 2a of the glass sheet 2, and the intersection point of the x-axis and the y-axis (i.e., origin) represents a peak position of the power density of the laser beam 32 of on the surface 2a. On the surface 2a of the glass sheet 2, the x-axis is arranged to be parallel to the moving direction of the peak position of the power density of the laser beam 32, and the y-axis is arranged to be perpendicular to the x-axis.

An irradiation area of the laser beam 32 that has passed through the first cylindrical lens 446 and the second cylindrical lens 447 is formed on the surface 2a of the glass sheet 2 as illustrated in FIG. 34. The irradiation area of the laser beam 32 on the surface 2a of the glass sheet 2 has an ellipse shape (with major axis length Aa and minor axis length Ba) having a minor axis diagonal to the x-axis (a major axis diagonal to the y-axis). Note that θ1a represents the angle between the x-axis and the minor axis of the ellipse.

Figure 35:
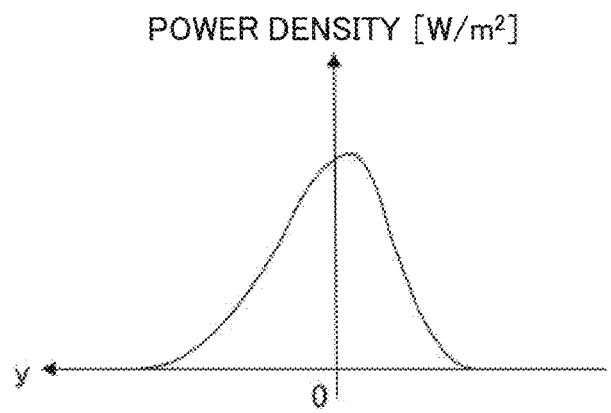
FIG. 35 is a graph showing a power density distribution on a parallel line (x=x3) that is parallel to the y-axis of FIG. 34.

FIG. 35 is a graph showing a power density distribution on a parallel line (x=x3) that is parallel to the y-axis of FIG. 34. As illustrated by the solid line in FIG. 35, the power density distribution of the laser beam 32 on the parallel line (x=x3) is asymmetrical with respect to the x-axis (y=0). In this way, a thermal stress distribution that is asymmetrical with respect to the x-axis (y=0) may be formed on the parallel line (x=x3).

As can be appreciated from the above, on the surface 2a of the glass sheet 2, the irradiation area of the laser beam 32 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the front side cleaved face 4a that is diagonally connected to the surface 2a of the glass sheet 2 may be formed.

Figure 36:
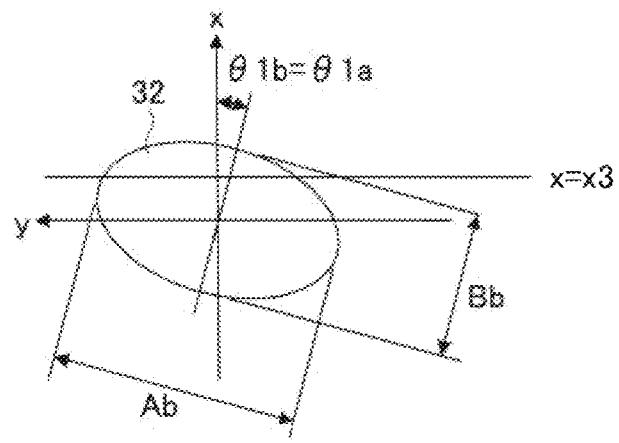
FIG. 36 is a plan view of an irradiation area of the laser beam on the back face of the glass sheet illustrated in FIG. 33.

FIG. 36 is a plan view of an irradiation area of the laser beam on the back face of the glass sheet illustrated in FIG. 33. In FIG. 36, an x-axis and a y-axis are defined on the back face 2b of the glass sheet 2 in a manner similar to the x-axis and the y-axis of FIG. 34.

An irradiation area of the laser beam 32 that has passed through the first cylindrical lens 446 and the second cylindrical lens 447 is formed on the back face 2b of the glass sheet 2 as illustrated in FIG. 36. The irradiation area of the laser beam 32 on the back face 2b of the glass sheet 2 has an ellipse shape (with major axis length Ab and minor axis length Bb) having a minor axis diagonal to the x-axis (a major axis diagonal to the y-axis). Note that θ1b represents the angle between the x-axis and the minor axis of the ellipse.

A power density distribution on a parallel line (x=x3) that is parallel to the y-axis of FIG. 36 may be substantially identical to the power density distribution illustrated in FIG. 35. That is, on the back face 2b of the glass sheet 2, the irradiation area of the laser beam 32 has an asymmetrical power density distribution that is asymmetrical with respect to a reference line (x-axis) that passes through the peak position of the power density of the laser beam 32 and is parallel to the moving direction of the peak position. In this way, a desired thermal stress field may be formed, and the backside cleaved face 4b that is diagonally connected to the back face 2b of the glass sheet 2 may be formed.

According to another aspect of the present invention, the irradiation areas of the laser beam 32 on the surface 2a and the back face 2b of the glass sheet 2 may each be arranged to have a shape that is asymmetrical with respect to a reference line (x-axis) that passes through a centroid position (origin in the x-y coordinate system) of the irradiation area and is parallel to the moving direction of the centroid position. In this way, different thermal stress fields may be formed on the left side and the right side of the x-axis, and as a result, the front side cleaved face 4a that is diagonally connected to the surface 2a of the glass sheet 2 and the backside cleaved face 4b that is diagonally connected to the back face 2b of the glass sheet 2 may be formed. Note that in the case where a reference line that passes through the centroid position of the irradiation area is used, the power density distribution of the laser beam 32 on the surface 2a or the back face 2b of the glass sheet 2 does not necessarily have to include a peak position, and the power density may be uniform, for example. Note that the same applies to the other embodiments.

According to the present embodiment, the front side cleaved face 4a and the backside cleaved face 4b as illustrated in FIGS. 3 and 5 may be formed by the thermal stress that is generated by the irradiation of the laser beam 32. When the output of the light source 30 is sufficiently high, the intermediate cleaved face 4c as illustrated in FIG. 4 may be formed. When the output of the light source 30 is insufficient, a heating light beam emitted from a heating light source separate from the light source 30 may be irradiated onto the glass sheet 2 in order to form the intermediate cleaved face 4c. In this way, thermal stress generated in the glass sheet 2 may be increased, and the intermediate cleaved face 4c as illustrated in FIG. 4 may be formed.

APPLICATION EXAMPLES

Test Example 1-1 to Test Example 1-5

In Test Example 1-1 to Test Example 1-5, a laser beam was incident perpendicularly with respect to the surface of a rectangular glass sheet (100 mm long, 50 mm wide, and 1.1 mm thick soda lime glass manufactured by Asahi Glass Co., Ltd.). A Yb fiber laser (wavelength 1070 nm) was used as the light source of the laser beam. The absorption coefficient ($\alpha$) of the glass sheet with respect to the laser beam was 0.65 cm$^{-1}$, and the product $\alpha \times M$ was equal to 0.07 (i.e., the internal transmittance was 93%). The laser beam used was of a type that forms a circular cross-sectional shape immediately after being emitted from the light source and has a Gaussian power density distribution.

In Test Example 1-1 to Test Example 1-4, a part of the light flux of the laser beam was shielded by the light shielding portion as illustrated in FIG. 6, and the irradiation shapes of the laser beam on the surface and the back face of the glass sheet were arranged to form a shape of a circle with a portion of the circle missing as illustrated in FIGS. 8 and 10. On the other hand, in Test Example 1-5, a light shielding portion was not used, and the irradiation shapes of the laser beam on the surface and the back face of the glass sheet were arranged into a circular shape with no portion missing.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at the position 15 mm from one short side of the glass sheet (85 mm from the other short side). An initial crack reaching the upper and lower faces of the glass sheet was formed at an edge face of the glass sheet using a wheel cutter. Evaluations were made on the form and the cross-section profile of the cleaved face formed at the glass sheet.

Table 1, which is shown below, indicates other experimental conditions along with the evaluation results of the above test examples. Conditions other than those indicated in Table 1 were the same in all of Test Example 1-1 to Test Example 1-5. Note that in the tables shown below, "P" represents the output of the light source, "v" represents the moving speed of the irradiating position of the laser beam on the surface and the back face of the glass sheet, "f" represents the focal length of the focus lens, "d" represents the distance from the surface of the glass sheet to the focusing position of the laser beam. When "d" is positive, this means that the focusing position of the laser beam is above the surface of the glass sheet (light source side), and when "d" is negative, this means that focusing position of the laser beam is below the surface of the glass sheet (opposite side of the light source). The definitions of the other symbols are provided above. In the tables shown below, the "FORM" of the cleavage represents the depth of the cleavage. Specifically, "SCRIBING" describes a case where the cleavage forms grooves as illustrated in FIGS. 3 and 5, and "FULL-CUTTING" describes a case where the cleavage penetrates through the glass sheet as illustrated in FIG. 4. Also, the "CROSS-SECTION PROFILE" of the cleavage represents the slopes of the front side cleaved face and the backside cleaved face. Specifically, "TYPE A" describes a case where the cleaved faces are arranged to have slopes as illustrated in FIGS. 3 and 4, "TYPE B" describes a case where the cleaved faces are arranged to have slopes as illustrated in FIG. 5, and "TYPE C" describes a case where the front side cleaved face and the backside cleaved face are arranged in a manner other than the above "TYPE A" and "TYPE B". For example, "TYPE C" may include cases where the front side cleaved face or the backside cleaved face is perpendicular or where the cross-section profile of the cleaved face could not be properly controlled. "TYPE C" includes a case where the cleavage forms a cleaved face that is perpendicular to the surface and the back face of the glass sheet and penetrates through the glass sheet in its thickness direction.

TABLE 1

| | P [W] | v [mm/s] | f [mm] | d [mm] | Φ1 [mm] | W1 [mm] | X0 [mm] | Y0 [mm] | Φa [mm] | x0a [mm] | y0a [mm] | Φb [mm] | x0b [mm] | y0b [mm] | FORM | CLEAVAGE CROSS-SECTION PROFILE |
|---|---|---|---|---|---|---|---|---|---|---|---|---|---|---|---|---|
| EXAMPLE 1-1 | 220 | 20 | 290 | −9.73 | 18 | 4 | −4 | 4 | 0.60 | −0.13 | 0.13 | 0.56 | −0.12 | 0.12 | SCRIBING | TYPE A |
| EXAMPLE 1-2 | 220 | 20 | 290 | −9.73 | 18 | 4 | −2 | 4 | 0.60 | −0.07 | 0.13 | 0.56 | −0.06 | 0.12 | SCRIBING | TYPE A |
| EXAMPLE 1-3 | 220 | 20 | 290 | −9.73 | 18 | 4 | 2 | 4 | 0.60 | 0.07 | 0.13 | 0.56 | 0.06 | 0.12 | SCRIBING | TYPE B |
| EXAMPLE 1-4 | 220 | 20 | 290 | −9.73 | 18 | 4 | 4 | 4 | 0.60 | 0.13 | 0.13 | 0.56 | 0.12 | 0.12 | SCRIBING | TYPE B |
| EXAMPLE 1-5 | 220 | 20 | 300 | 13.77 | 13 | — | — | — | 0.60 | — | — | 0.63 | — | — | SCRIBING | TYPE C |

In Test Example 1-1 to Test Example 1-4, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed. On the other hand, in Test Example 1-5, power density distributions that are symmetrical with respect to a predetermined reference line were formed on the surface and the back face of the glass sheet, and as a result, a cleaved face of "TYPE C" was formed.

Test Example 2-1 to Test Example 2-7

In Test Example 2-1 to Test Example 2-7, a laser beam was incident perpendicularly with respect to the surface a rectangular glass sheet (100 mm long, 50 mm wide, and 3.1 mm thick soda lime glass manufactured by Asahi Glass Co., Ltd.). A Yb fiber laser (wavelength 1070 nm) was used as the light source of the laser beam. The absorption coefficient ($\alpha$) of the glass sheet with respect to the laser beam was 2.86 cm$^{-1}$, and the product $\alpha \times M$ was equal to 0.89 (i.e., the internal transmittance was 41%). The laser beam used was of a type that forms a circular cross-sectional shape immediately after being emitted from the light source and has a Gaussian power density distribution.

In Test Example 2-1 to Test Example 2-6, a part of the light flux of the laser beam was shielded by a light shielding portion as illustrated in FIG. 13, and the irradiation shapes of the laser beam on the surface and the back face of the glass sheet were arranged to form a shape of a circle with a portion of the circle missing as illustrated in FIGS. 16 to 21. On the other hand, in Test Example 2-7, a light shielding portion was not used, and the irradiation shapes of the laser beam on the surface and the back face of the glass sheet were arranged into a circular shape with no portion missing.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed at an edge face of the glass sheet using a wheel cutter. Evaluations were made on the form and the cross-section profile of a cleaved face that was formed on the glass sheet.

Table 2, which is shown below, indicates other experimental conditions along with the evaluation results of the above test examples. Conditions other than those indicated in Table 2 were the same in all of Test Example 2-1 to Test Example 2-7.

TABLE 2

| | P [W] | v [mm/s] | f [mm] | d [mm] | Φ1 [mm] | R0 [mm] | Θ0 [°] | Φa [mm] | r0a [mm] | Φb [mm] | r0b [mm] | FORM | CLEAVAGE CROSS-SECTION PROFILE |
|---|---|---|---|---|---|---|---|---|---|---|---|---|---|
| EXAMPLE 2-1 | 50 | 10 | 40 | −5.63 | 24 | 4 | 0 | 3.38 | 0.56 | 2.17 | 0.36 | FULL-CUTTING | TYPE A |
| EXAMPLE 2-2 | 50 | 10 | 40 | −5.63 | 24 | 4 | 45 | 3.38 | 0.56 | 2.17 | 0.36 | FULL-CUTTING | TYPE B |
| EXAMPLE 2-3 | 50 | 10 | 40 | −5.63 | 24 | 4 | 135 | 3.38 | 0.56 | 2.17 | 0.36 | FULL-CUTTING | TYPE A |
| EXAMPLE 2-4 | 50 | 10 | 40 | −5.63 | 24 | 4 | 180 | 3.38 | 0.56 | 2.17 | 0.36 | FULL-CUTTING | TYPE B |
| EXAMPLE 2-5 | 50 | 10 | 40 | −5.63 | 24 | 4 | 225 | 3.38 | 0.56 | 2.17 | 0.36 | FULL-CUTTING | TYPE B |
| EXAMPLE 2-6 | 50 | 10 | 40 | −5.63 | 24 | 4 | 315 | 3.38 | 0.56 | 2.17 | 0.36 | FULL-CUTTING | TYPE A |
| EXAMPLE 2-7 | 40 | 10 | 40 | −5.63 | 24 | — | — | 3.38 | — | 2.17 | — | FULL-CUTTING | TYPE C |

In Test Example 2-1 to Test Example 2-6, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed. On the other hand, in Test Example 2-7, power density distributions that are symmetrical with respect to a predetermined reference line were formed on the surface and the back face of the glass sheet, and as a result, a cleaved face of "TYPE C" was formed. Also, the thermal stress generated by the irradiation of the laser beam 32 was sufficiently large such that an intermediate cleaved face that interconnects the front side cleaved face and the backside cleaved face could be formed, and full-cutting of the glass sheet could be realized.

Test Example 3-1 and Test Example 3-2

In Test Example 3-1 and Test Example 3-2, a laser beam was incident perpendicularly with respect to the surface a rectangular glass sheet (100 mm long, 50 mm wide, and 3.1 mm thick soda lime glass manufactured by Asahi Glass Co., Ltd.). A Yb fiber laser (wavelength 1070 nm) was used as the light source of the laser beam. The absorption coefficient (α) of the glass sheet with respect to the laser beam was 2.86 cm$^{-1}$, and the product α×M was equal to 0.89 (i.e., the internal transmittance was 41%). The laser beam used was of a type that forms a circular cross-sectional shape immediately after being emitted from the light source and has a Gaussian power density distribution.

In Test Example 3-1 and Test Example 3-2, a part of the light flux of the laser beam was shielded by a light shielding portion as illustrated in FIG. 25, and the irradiation shapes of the laser beam on the surface and the back face of the glass sheets were arranged into a circular shape as illustrated in FIGS. 26 and 28.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed on an edge face of the glass sheet using a wheel cutter. Evaluations were made on the form and the cross-section profile of a cleaved face that was formed on the glass sheet.

Table 3, which is shown below, indicates other experimental conditions along with the evaluation results of the above test examples. Conditions other than those indicated in Table 3 were the same in Test Example 3-1 and Test Example 3-2.

In Test Example 3-1 and Test Example 3-2, power density distributions that are asymmetrical with respect to a predetermined reference line were formed on the surface and the back face of the glass sheet, and as a result, a front side cleaved that is diagonally connected to the surface of the glass sheet and a backside cleaved face that is diagonally connected to the back face of the glass sheet could be formed.

Test Example 4-1 and Test Example 4-2

In Test Example 4-1 and Test Example 4-2, a laser beam was incident perpendicularly with respect to the surface a rectangular glass sheet (100 mm long, 50 mm wide, and 1.1 mm thick soda lime glass manufactured by Asahi Glass Co., Ltd.). A Yb fiber laser (wavelength 1070 nm) was used as the light source of the laser beam. The absorption coefficient (α) of the glass sheet with respect to the laser beam was 0.65 cm$^{-1}$, and the product α×M was equal to 0.07 (i.e., the internal transmittance was 93%). The laser beam used was of a type that forms a circular cross-sectional shape immediately after being emitted from the light source and has a Gaussian power density distribution.

In Test Example 4-1 and Test Example 4-2, the optical axis of a focus lens and the optical axis of the laser beam entering the focus lens were shifted from each other in parallel as illustrated in FIG. 29, and the irradiation shapes of the laser beam on the surface and the back face of the glass sheet were arranged into a distorted circular shape as illustrated in FIG. 31.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed on an edge face of the glass sheet using a wheel cutter. Evaluations were made on the form and the cross-section profile of a cleaved face that was formed on the glass sheet.

Table 4, which is shown below, indicates other experimental conditions along with the evaluation results of the above test examples. Conditions other than those indicated in Table 4 were the same in Test Example 4-1 and Test Example 4-2. In Table 4, "Da" represents the area average diameter of the irradiation area of the laser beam on the surface of the glass sheet, and "Db" represents the area average diameter of the irradiation area of the laser beam on the back face of the glass sheet.

TABLE 3

| | P [W] | v [mm/s] | f [mm] | d [mm] | Φ1 [mm] | Φ2 [mm] | X1 [mm] | Y1 [mm] | Φa [mm] | x1a [mm] | y1a [mm] | Φb [mm] | x1b [mm] | y1b [mm] | CLEAVAGE FORM | CLEAVAGE CROSS-SECTION PROFILE |
|---|---|---|---|---|---|---|---|---|---|---|---|---|---|---|---|---|
| EXAMPLE 3-1 | 45 | 10 | 80 | −8.66 | 24 | 20 | 0 | −4 | 2.17 | 0.00 | −0.43 | 1.65 | 0.00 | −0.33 | SCRIBING | TYPE A |
| EXAMPLE 3-2 | 45 | 10 | 80 | −8.66 | 24 | 20 | 0 | 4 | 2.17 | 0.00 | 0.43 | 1.65 | 0.00 | 0.33 | SCRIBING | TYPE B |

TABLE 4

| | P [W] | v [mm/s] | f [mm] | d [mm] | Φ3 [mm] | Φ4 [mm] | X2 [mm] | Y2 [mm] | Da [mm] | Db [mm] | CLEAVAGE FORM | CROSS-SECTION PROFILE |
|---|---|---|---|---|---|---|---|---|---|---|---|---|
| EXAMPLE 4-1 | 240 | 20 | 280 | −9.73 | 18 | 30 | 0 | −4 | 0.60 | 0.56 | SCRIBING | TYPE A |
| EXAMPLE 4-2 | 240 | 20 | 280 | −9.73 | 18 | 30 | 0 | 4 | 0.60 | 0.56 | SCRIBING | TYPE B |

In Test Example 4-1 and Test Example 4-2, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed.

Test Example 5-1 and Test Example 5-2

In Test Example 5-1 and Test Example 5-2, a laser beam was incident perpendicularly with respect to the surface a rectangular glass sheet (100 mm long, 50 mm wide, and 2.0 mm thick soda lime glass manufactured by Asahi Glass Co., Ltd.). A Yb fiber laser (wavelength 1070 nm) was used as the light source of the laser beam. The absorption coefficient (α) of the glass sheet with respect to the laser beam was 2.86 cm$^{-1}$, and the product α×M was equal to 0.57 (i.e., the internal transmittance was 56%). The laser beam used was of a type that forms a circular cross-sectional shape immediately after being emitted from the light source and has a Gaussian power density distribution.

In Test Example 5-1 and Test Example 5-2, two cylindrical lenses were used as illustrated in FIG. 33, and the irradiation shapes of the laser beam on the surface and the back face of the glass sheet were arranged into an ellipse shape as illustrated in FIGS. 34 and 36.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed on an edge face of the glass sheet using a wheel cutter. Evaluations were made on the form and the cross-section profile of a cleaved face that was formed on the glass sheet.

Table 5, which is shown below, indicates other experimental conditions along with the evaluation results of the above test examples. Conditions other than those indicated in Table 5 were the same in Test Example 5-1 and Test Example 5-2.

TABLE 5

| | P [W] | v [mm/s] | Θ1 [°] | Aa [mm] | Ba [mm] | Ab [mm] | Bb [mm] | CLEAVAGE FORM | CROSS-SECTION PROFILE |
|---|---|---|---|---|---|---|---|---|---|
| EXAMPLE 5-1 | 75 | 20 | −15 | 1.80 | 1.00 | 1.48 | 0.79 | FULL-CUTTING | TYPE B |
| EXAMPLE 5-2 | 75 | 20 | 15 | 1.80 | 1.00 | 1.48 | 0.79 | FULL-CUTTING | TYPE A |

In Test Example 5-1 and Test Example 5-2, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed. Also, the thermal stress generated by the irradiation of the laser beam 32 was sufficiently large such that an intermediate cleaved face that interconnects the front side cleaved face and the backside cleaved face could be formed, and in this way, full-cutting of the glass sheet could be realized.

Test Example 6-1

In Test Example 6-1, a laser beam was incident perpendicularly with respect to the surface of a rectangular glass sheet (100 mm long, 50 mm wide, and 3.4 mm thick soda lime glass manufactured by Asahi Glass Co., Ltd.). A Yb fiber laser (wavelength 1070 nm) was used as the light source of the laser beam. The absorption coefficient (α) of the glass sheet with respect to the laser beam was 3.16 cm$^{-1}$, and the product α×M was equal to 1.07 (i.e., the internal transmittance was 34%). The laser beam used was of a type that forms a circular cross-sectional shape immediately after being emitted from the light source and has a Gaussian power density distribution. Also, a part of the light flux of the laser beam was shielded by a light shielding portion as illustrated in FIG. 13, and the irradiation shapes of the laser beam on the surface and the back face of the glass sheet were arranged to form a shape of a circle with a portion of the circle missing as illustrated in FIG. 16.

Also, in Test Example 6-1, a heating light beam was incident diagonally with respect to the surface of a rectangular glass sheet. A Yb fiber laser (wavelength 1070 nm) was used as the heating light source. The irradiation area of the heating light beam on the surface of the glass sheet was arranged into a circular shape with a diameter of 20 mm, the output of the heating light source was 60 W, the incident angle (α) of the heating light beam when viewed from the x-axis direction was 30°, and the incident angle of the heating light beam when viewed from y-axis direction was 0°.

Also, in Test Example 6-1, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 10 mm from one short side of the glass sheet (90 mm from the other short side). The peak position of the power density of the heating light beam was arranged at a position where δx=8 (mm) and δy=8 (mm), and the peak position of the power density of the heating light beam was moved along with the peak position of the power density of the laser beam. An initial crack reaching the upper and lower faces of the glass sheet was formed at an edge face of the glass sheet using a wheel cutter. Evaluations were made on the form and the cross-section profile of a cleaved face that was formed on the glass sheet.

Table 6, which is shown below, indicates other experimental conditions along with the evaluation results of the above test example.

lime glass manufactured by Asahi Glass Co., Ltd.). A Yb fiber laser (wavelength 1070 nm) was used as the light source of the laser beam. The absorption coefficient (α) of the glass sheet with respect to the laser beam was 0.65 cm$^{-1}$, the product α×M was equal to 0.04 (i.e., the internal transmittance was 96%). The laser beam used was of a type that forms a circular cross-sectional shape immediately after being emitted from the light source and has a Gaussian power density distribution.

In Test Example 7-1, two cylindrical lenses were used as illustrated in FIG. 33, and the irradiation shapes of the laser beam on the surface and the back face of the glass sheet were arranged to form an ellipse shape as illustrated in FIGS. 34 and 36.

In the above test example, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed at an edge face of the glass sheet using a wheel cutter. Evaluations

TABLE 6

| | | | | | | | | | | | | CLEAVAGE | |
|---|---|---|---|---|---|---|---|---|---|---|---|---|---|
| | P [W] | v [mm/s] | f [mm] | d [mm] | Φ1 [mm] | R0 [mm] | Θ0 [°] | Φa [mm] | r0a [mm] | Φb [mm] | r0b [mm] | FORM | CROSS-SECTION PROFILE |
| EXAMPLE 6-1 | 50 | 10 | 80 | 5.57 | 24 | 2 | 180 | 1.67 | 0.14 | 2.35 | 0.20 | FULL-CUTTING | TYPE A |

In Test Example 6-1, power density distributions that are asymmetrical with respect to a predetermined reference line were formed on the surface and the back face of the glass sheet, and as a result, a front side cleaved face that is diagonally connected to the surface of the glass sheet and a were made on the form and the cross-section profile of a cleaved face that was formed on the glass sheet.

Table 7, which is shown below, indicates other relevant experimental conditions along with the evaluation results of the above test example.

TABLE 7

| | | | | | | | | CLEAVAGE | |
|---|---|---|---|---|---|---|---|---|---|
| | P [W] | v [mm/s] | Θ1 [°] | Aa [mm] | Ba [mm] | Ab [mm] | Bb [mm] | FORM | CROSS-SECTION PROFILE |
| EXAMPLE 7-1 | 460 | 30 | 60 | 0.30 | 0.20 | 0.31 | 0.21 | SCRIBING | TYPE A | backside cleaved face that is diagonally connected to the back face of the glass sheet could be formed. Further, the thermal stress generated by the laser beam and the heating light beam promoted the formation of an intermediate cleaved face interconnecting the front side cleaved face and the backside cleaved face, and as a result, full-cutting of the glass sheet could be realized.

Test Example 7-1

In Test Example 7-1, a laser beam was incident perpendicularly with respect to the surface of a rectangular glass sheet (100 mm long, 50 mm wide, and 0.55 mm thick soda In Test Example 7-1, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed.

Test Example 8-1 and Test Example 8-2

In Test Example 8-1 and Test Example 8-2, a laser beam was incident perpendicularly with respect to the surface of a rectangular glass sheet (100 mm long, 50 mm wide, and 2.8 mm thick soda lime glass manufactured by Asahi Glass Co., Ltd.). A Yb fiber laser (wavelength 1070 nm) was used as the light source of the laser beam. The absorption coefficient (α) of the glass sheet with respect to the laser beam was 0.65 cm$^{-1}$, and the product α×M was equal to 0.18 (i.e., the internal transmittance was 84%). The laser beam used was of a type that forms a circular cross-sectional shape immediately after being emitted from the light source and has a Gaussian power density distribution.

In Test Example 8-1 and Test Example 8-2, two cylindrical lenses were used as illustrated in FIG. 33, and the irradiation shapes of the laser beam on the surface and the back face of the glass sheet were arranged to forma an ellipse shape as illustrated in FIGS. 34 and 36.

In each of the above test examples, the peak position of the power density of the laser beam on the surface and the back face of the glass sheet was moved from one long side of the glass sheet to the other long side of the glass sheet in a direction parallel to the short side of the glass sheet. The peak position of the power density of the laser beam was arranged at a position 15 mm from one short side of the glass sheet (85 mm from the other short side). An initial crack reaching the upper and lower faces of the glass sheet was formed on an edge face of the glass sheet using a wheel cutter. Evaluations were made on the form and the cross-section profile of a cleaved face that was formed on the glass sheet.

Table 8, which is shown below, indicates other experimental conditions along with the evaluation results of the above test examples. Conditions other than those indicated in Table 8 were the same in Test Example 8-1 and Test Example 8-2.

tion have been described above with respect to certain illustrative embodiments, the present invention is not limited to these embodiments and various changes and modifications may be made within the scope of the present invention.

For example, although the laser beam 32 of the above-described embodiments is incident perpendicularly with respect to the surface 2a of the glass sheet 2, in other embodiments a laser beam may be incident diagonally. For example, a laser beam may be incident diagonally with respect to the y-axis direction.

Also, in the above-described embodiments, the irradiation area of the laser beam on the surface of the glass sheet and the irradiation area of the laser beam on the back face of the glass sheet each have a peak position of the power density of the laser beam. However, in other embodiments, the irradiation areas of the laser beam on the surface and the back face of the glass sheet do not have to have such a peak position. Note that having "no peak position" means that a position where the power density reaches its maximum is not limited to one single position but includes multiple positions. In a case where the irradiation area of the laser beam on the surface of the glass sheet and the irradiation area of the laser beam on the back face of the glass sheet do not have a peak position, the irradiation areas of the laser beam on the surface and the back face of the glass sheet may each be arranged to be asymmetrical with respect to a reference line that passes through a centroid position of the irradiation area and is parallel to the moving direction of the centroid position. In this way, desired thermal stress fields may be formed on the surface and the back face of the glass sheet, and as a result, a front side cleaved face that is diagonally connected to the surface of the glass sheet and a

TABLE 8

| | P [W] | v [mm/s] | Θ1 [°] | Aa [mm] | Ba [mm] | Ab [mm] | Bb [mm] | CLEAVAGE FORM | CROSS-SECTION PROFILE |
|---|---|---|---|---|---|---|---|---|---|
| EXAMPLE 8-1 | 400 | 30 | 60 | 1.80 | 1.20 | 1.87 | 1.25 | SCRIBING | TYPE A |
| EXAMPLE 8-2 | 420 | 70 | 60 | 0.60 | 0.40 | 0.67 | 0.45 | SCRIBING | TYPE A |

In Test Example 8-1 and Test Example 8-2, power density distributions that are asymmetrical with respect to a predetermined reference line were formed on the surface and the back face of the glass sheet, and as a result, a front side cleaved face that is diagonally connected to the surface of the glass sheet and a backside cleaved face that is diagonally connected to the back face of the glass sheet could be formed.

Figure 37:
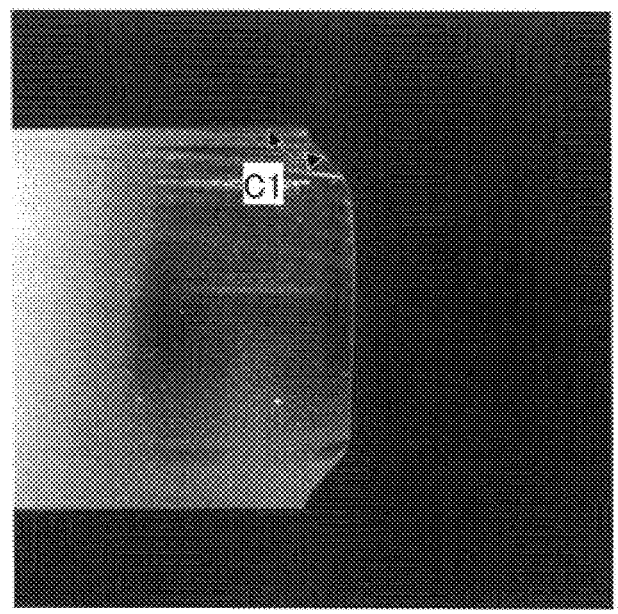
FIG. 37 is a micrograph of a cut piece of a glass sheet of Test Example 8-1 that has subsequently had an intermediate cleaved face formed therein by an external force.
Figure 38:
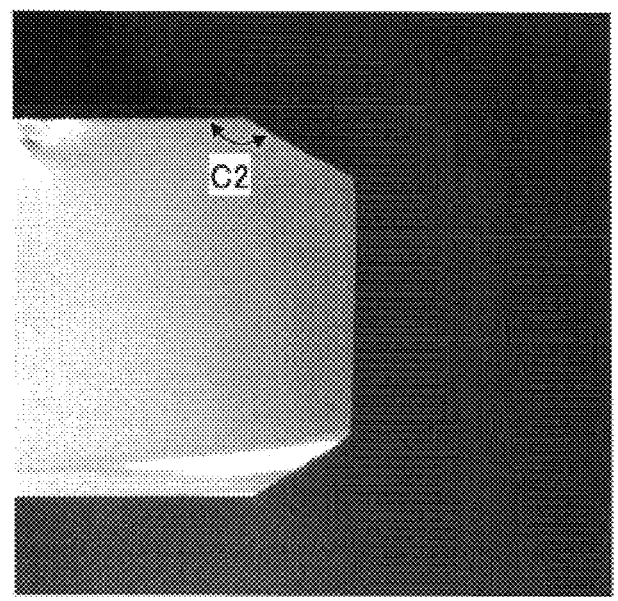
FIG. 38 is a micrograph of a cut piece of a glass sheet of Test Example 8-2 that has subsequently had an intermediate cleaved face formed therein by an external force.

FIG. 37 is a micrograph of a cut piece of the glass sheet of Test Example 8-1 that subsequently had an intermediate cleaved face formed therein by an external force. FIG. 38 is a micrograph of a cut piece of the glass sheet of Test Example 8-2 that subsequently had an intermediate cleaved face formed therein by an external force.

Note that a connection angle C2 between an edge face and the surface or the back face of the cut piece illustrated in FIG. 38 is larger than a connection angle C1 between an edge face and the surface or the back face of the cut piece illustrated in FIG. 37. It can be appreciated from Test Example 8-1 and Test Example 8-2 that the connection angle can be adjusted by controlling the size and the irradiation power of the laser beam that is irradiated on the surface and the back face of the glass sheet.

Although a glass sheet processing method and a glass sheet processing apparatus according to the present invenbackside cleaved face that is diagonally connected to the back face of the glass sheet may be formed. Also, in this case, the centroid position is used as the origin instead of the peak position of the power density of the laser beam.

Also, the glass sheet processing method according to the above-described embodiment may be applied to figured glass having a concavo-convex pattern formed on its surface, wired glass having a metal mesh or lines embedded therein, laminated glass, and tempered glass, for example. Laminated glass refers to glass having an intermediate film inserted between glass sheets that are bonded together. In the case where the glass sheet processing method is applied to laminated glass, a front side cleaved face and a backside cleaved face may be formed on each of the glass sheets. In this case, the intermediate film may be cut after cutting the glass sheets, for example.

What is claimed is:
1. A glass sheet processing method, comprising:
  irradiating a laser beam on a glass sheet such that the laser beam is transmitted through the glass sheet from a surface to a back face of the glass sheet;
  moving an irradiating position of the laser beam with respect to the glass sheet; and forming a cleavage in the glass sheet with thermal stress that is generated by irradiating the laser beam, wherein the laser beam is emitted from a light source and is irradiated on the surface of the glass sheet to form an irradiation area of the laser beam on the surface, and the laser beam that has been transmitted through the surface of the glass sheet is irradiated on the back face of the glass sheet to form an irradiation area of the laser beam on the back face; and wherein in a case where each irradiation area includes a peak position of a power density of the laser beam, each irradiation area is arranged to have an asymmetrical power density distribution that is asymmetrical with respect to a reference line that passes through the peak position of the irradiation area and is parallel to a moving direction of the peak position, and in a case where each irradiation area does not include a peak position of a power density of the laser beam, each irradiation area is arranged to have an asymmetrical shape that is asymmetrical with respect to a reference line that passes through a centroid position of the irradiation area and is parallel to a moving direction of the centroid position.

2. The glass sheet processing method according to claim 1, wherein
a product ($\alpha \times M$) of an absorption coefficient ($\alpha$) ($cm^{-1}$) of the glass sheet with respect to the laser beam and a moving distance (M) (cm) of the laser beam moving from the surface to the back face of the glass sheet is greater than 0 and is less than or equal to 3.0.

3. The glass sheet processing method according to claim 1, wherein
the irradiation areas of the laser beam on the surface and the back face of the glass sheet are formed by shielding a part of a light flux of the laser beam, and irradiating a remainder of the light flux of the laser beam on the glass sheet.

4. The glass sheet processing method according to claim 1, wherein
the laser beam emitted from the light source is focused by a focus lens and irradiated on the glass sheet, and the irradiation areas of the laser beam on the surface and the back face of the glass sheet are formed by arranging an optical axis of the focus lens and an optical axis of the laser beam entering the focus lens to be shifted from each other.

5. The glass sheet processing method according to claim 1, wherein
each of the irradiation areas of the laser beam on the surface and the back face of the glass sheet is arranged into an ellipse shape having a minor axis or a major axis that is diagonal with respect to a moving direction.

6. The glass sheet processing method according to claim 1, wherein a wavelength of the laser beam is within a range of from 250 nm to 5000 nm.

7. The glass sheet processing method according to claim 1, further comprising:
irradiating a heating light beam for heating the glass sheet at an irradiating position of the laser beam, and moving an irradiating position of the heating light beam with respect to the glass sheet along with the irradiating position of the laser beam with respect to the glass sheet.

8. The glass sheet processing method according to claim 2, wherein the irradiation areas of the laser beam on the surface and the back face of the glass sheet are formed by shielding a part of a light flux of the laser beam, and irradiating a remainder of the light flux of the laser beam on the glass sheet.

9. The glass sheet processing method according to claim 2, wherein the laser beam emitted from the light source is focused by a focus lens and irradiated on the glass sheet, and the irradiation areas of the laser beam on the surface and the back face of the glass sheet are formed by arranging an optical axis of the focus lens and an optical axis of the laser beam entering the focus lens to be shifted from each other.

10. A glass sheet processing apparatus, comprising:
a support that supports a glass sheet;
a light source that emits a laser beam to be transmitted through the glass sheet from a surface to a back face of the glass sheet that is supported by the support;
an optical device comprising a lens and configured to irradiate the laser beam emitted from the light source on the glass sheet that is supported by the support;
an irradiating position moving device configured to move the support, the light source and the optical device, or the support, the light source and the optical device such that an irradiating position of the laser beam is moved with respect to the glass sheet; and
a control device comprising circuitry implementing a control program configured to control the light source, the optical device and the irradiating position moving device such that the optical device forms an irradiation area of the laser beam on the surface of the glass sheet by irradiating the laser beam emitted from the light source on the surface, and forms an irradiation area of the laser beam on the back face of the glass sheet by irradiating the laser beam that has been transmitted through the surface on the back face of the glass sheet, that the irradiating position moving device moves the irradiating position of the laser beam with respect to the glass sheet, and that a cleavage is formed in the glass sheet with thermal stress that is generated by irradiating the laser beam,
wherein the circuitry of the control device is configured to control the light source, the optical device and the irradiating position moving device such that in a case where each irradiation area includes a peak position of a power density of the laser beam, each irradiation is arranged to have an asymmetrical power density distribution that is asymmetrical with respect to a reference line that passes through the peak position of the irradiation area and is parallel to a moving direction of the peak position, and that in a case where each irradiation area does not include a peak position of a power density of the laser beam, each irradiation area is arranged to have an asymmetrical shape that is asymmetrical with respect to a reference line that passes through a centroid position of the irradiation area and is parallel to a moving direction of the centroid position.

11. The glass sheet processing apparatus according to claim 10, wherein the optical device includes a light shielding device configured to shield a part of a light flux of the laser beam emitted from the light source.

12. The glass sheet processing apparatus according to claim 11, wherein the light shielding device of the optical device comprises a light shielding plate configured to shield a part of a light flux of the laser beam emitted from the light source.

13. The glass sheet processing apparatus according to claim 11, wherein the light shielding device of the optical device comprises a light shielding film configured to shield a part of a light flux of the laser beam emitted from the light source.

14. The glass sheet processing apparatus according to claim 10, wherein the lens of the optical device comprises a focus lens that focuses the laser beam emitted from the light source, and an optical axis of the laser beam entering the focus lens and an optical axis of the focus lens are shifted from each other.

15. The glass sheet processing apparatus according to claim 14, further comprising:
an optical axis position adjusting device configured to adjust a position of the optical axis of the focus lens with respect to the optical axis of the laser beam entering the focus lens.

16. The glass sheet processing apparatus according to claim 10, wherein the lens of the optical device comprises a cylindrical lens that focuses the laser beam emitted from the light source in a predetermined direction, and the optical device is configured to form the irradiation area of the laser beam that has an ellipse shape with a minor axis that is diagonal to a moving direction on each of the surface and the back face of the glass sheet that is supported by the support.

17. The glass sheet processing apparatus according to claim 10, further comprising:
a focusing position adjusting device configured to adjust a focusing position of the laser beam with respect to the glass sheet that is supported by the support.

18. The glass sheet processing apparatus according to claim 10, wherein the light source emits the laser beam having a wavelength within a range of from 250 nm to 5000 nm.

19. The glass sheet processing apparatus according to claim 10, further comprising:
a heating light source that emits a heating light beam for heating the glass sheet that is supported by the support, wherein the irradiating position moving device is configured to move an irradiating position of the heating light beam with respect to the glass sheet along with the irradiation position of the laser beam with respect to the glass sheet.

20. The glass sheet processing apparatus according to claim 10, wherein the lens of the optical device comprises a plurality of cylindrical lenses that focus the laser beam emitted from the light source in a predetermined direction, and the optical device is configured to form the irradiation area of the laser beam that has an ellipse shape with a minor axis that is diagonal to a moving direction on each of the surface and the back face of the glass sheet that is supported by the support.

* * * * *